(12) United States Patent
Abe et al.

(10) Patent No.: US 11,808,328 B2
(45) Date of Patent: Nov. 7, 2023

(54) NUT AND BALL SCREW DEVICE

(71) Applicant: NSK Ltd., Tokyo (JP)

(72) Inventors: Yasuaki Abe, Kanagawa (JP); Shuhei Yumiba, Kanagawa (JP); Yasumi Watanabe, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/031,926

(22) PCT Filed: Oct. 13, 2022

(86) PCT No.: PCT/JP2022/038134
§ 371 (c)(1),
(2) Date: Apr. 14, 2023

(65) Prior Publication Data
US 2023/0287967 A1 Sep. 14, 2023

(30) Foreign Application Priority Data
Jan. 27, 2022 (JP) .................................. 2022-010680

(51) Int. Cl.
*F16H 25/22* (2006.01)
(52) U.S. Cl.
CPC ................................. *F16H 25/2219* (2013.01)
(58) Field of Classification Search
CPC .......................... F16H 25/2219; F16H 25/2214
See application file for complete search history.

(56) References Cited

U.S. PATENT DOCUMENTS 10,138,985 B2 11/2018 Iwasaki
2023/0015290 A1* 1/2023 Yamada .............. F16H 25/2214

FOREIGN PATENT DOCUMENTS

JP 6511463 B2 5/2019
JP 2021-032364 A 3/2021
JP 2021-188687 A 12/2021

OTHER PUBLICATIONS

International Search Report for PCT/JP2022/038134 dated Dec. 27, 2022.
Written Opinion for PCT/JP2022/038134 dated Dec. 27, 2022.

* cited by examiner

*Primary Examiner* — Terence Boes
(74) *Attorney, Agent, or Firm* — Sughrue Mion, PLLC

(57) ABSTRACT

To provide a nut that can suppress increase in the number of components. The nut according to the present disclosure includes a nut main body and a circulation component. The nut main body includes a housing part having a bow shape when viewed from an axial direction, a seat surface, a through hole, and a pair of side surfaces. The circulation component includes a circulation component main body, two arm parts extending toward both sides in a seat surface direction from the circulation component main body, ribs projecting from the respective two arm parts, and caulking parts obtained by caulking the ribs. Recessed parts that the caulking parts enter are disposed on the pair of side surfaces. A ball passage is disposed in the circulation component main body.

15 Claims, 26 Drawing Sheets

FIG.1
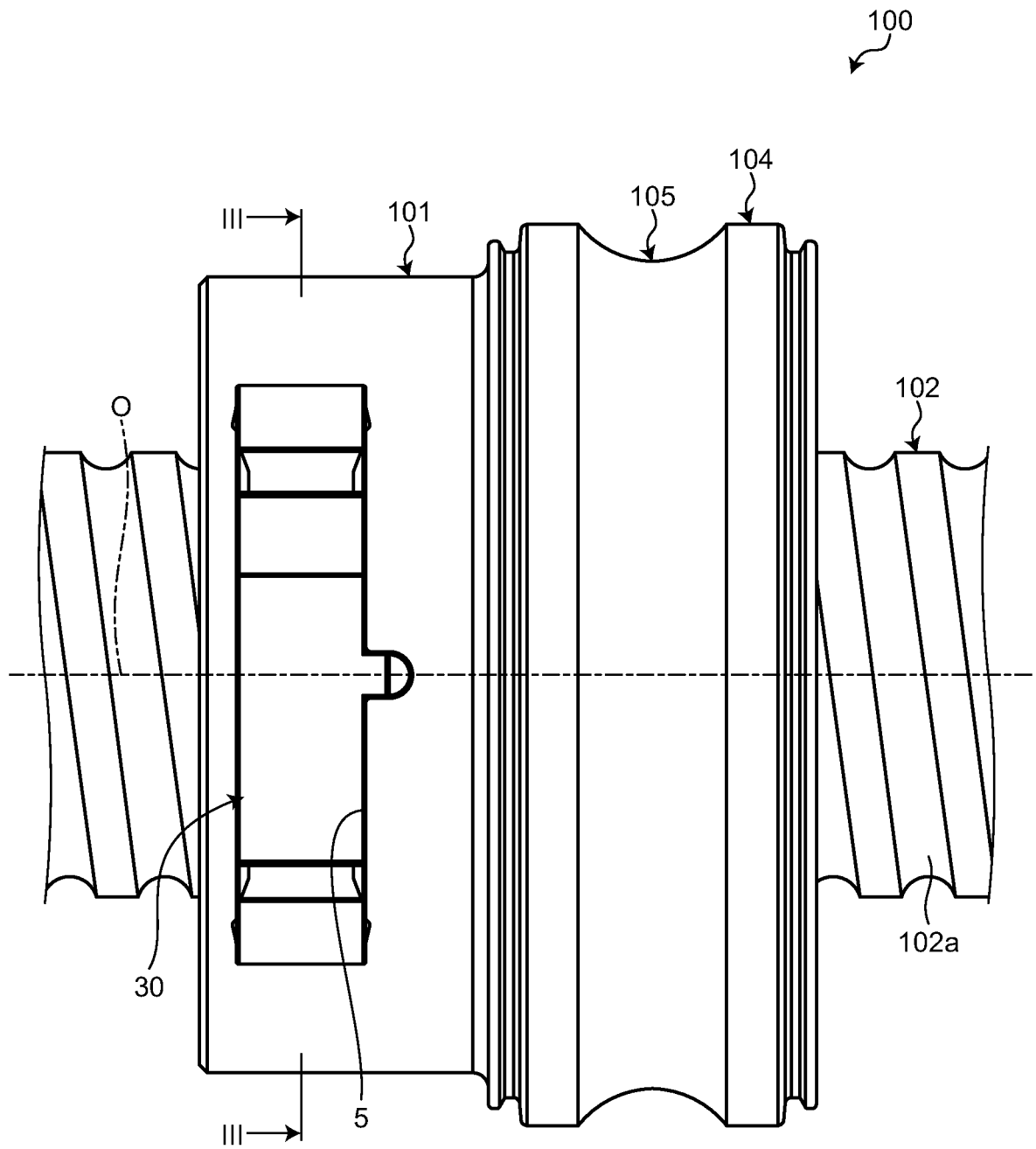
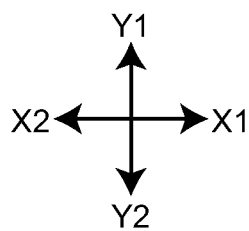

NUT AND BALL SCREW DEVICE

CROSS REFERENCE TO RELATED APPLICATIONS

This application is a National Stage of International Application No. PCT/JP2022/038134 filed Oct. 13, 2022, claiming priority based on Japanese Patent Application No. 2022-010680 filed Jan. 27, 2022.

FIELD

The present disclosure relates to a nut and a ball screw device.

BACKGROUND

The ball screw device includes a nut, a screw shaft passing through the nut, and a plurality of balls rolling along a raceway between the nut and the screw shaft. The nut includes a nut main body and a circulation component. The circulation component is a component that causes a ball that has moved from one end of the raceway to the other end of the raceway to circulate to the one end of the raceway.

As an example of the circulation component, a middle deflector can be exemplified. The middle deflector is typically arranged on a recessed part disposed on an outer peripheral surface of the nut main body. As a method for fixing the middle deflector, in the following Patent Literature, a through hole extending from an end face of the nut main body in an axial direction is disposed on each of the nut main body and the middle deflector. Additionally, a pin is inserted into the through hole. Thus, the middle deflector is hooked by the pin, and is not detached from the nut main body.

CITATION LIST

Patent Literature

Patent Literature 1: Japanese Patent No. 6511463

SUMMARY

Technical Problem

The fixing method using the pin increases the number of components. Additionally, through holes are required for the nut main body and the circulation component, so that a layout thereof is limited. Thus, there is a demand for development of a nut that can fix the circulation component without using the pin.

The present disclosure has been made in view of such a situation, and aims at providing a nut and a ball screw device that can suppress increase in the number of components.

Solution to Problem

To achieve the above object, a nut according to a first aspect of the present disclosure comprising: a nut main body having a cylindrical shape through which a screw shaft passes; and a circulation component assembled to the nut main body, wherein the nut main body comprises: a housing part that is an indentation disposed on an outer peripheral surface of the nut main body and has a bow shape when viewed from an axial direction parallel with the screw shaft; a seat surface forming a bottom surface of the housing part; a through hole passing through the seat surface and an inner peripheral surface of the nut main body; and a pair of side surfaces opposed to each other that are arranged on both sides in the axial direction parallel with the screw shaft with respect to the housing part, a direction parallel with the seat surface when viewed from the axial direction is a seat surface direction, a direction perpendicular to the seat surface, which is the direction that the seat surface faces, is a first vertical direction, the circulation component comprises: a circulation component main body arranged in the housing part and the through hole; two arm parts extending from the circulation component main body toward both sides in the seat surface direction, and abutting on the seat surface; ribs projecting from the respective two arm parts in the first vertical direction, and extending in the seat surface direction along the side surface; and a caulking part obtained by caulking at least part of the rib toward the side surface, a recessed part as a groove extending in the seat surface direction and being opposed to the rib in the axial direction is disposed on each of the pair of side surfaces, the recessed part that the caulking part enters, a ball passage extending in a tangential direction with respect to a raceway for a ball is disposed on the circulation component main body, the circulation component is obtained by joining an inner peripheral side component to an outer peripheral side component that are divided at a division surface extending along the ball passage when viewed from the axial direction, the inner peripheral side component comprises: a tongue that scoops up the ball from the raceway; an inner peripheral side rolling surface surrounding an inner peripheral side of the ball passage; and one of the two arm parts, and the outer peripheral side component comprises: an outer peripheral side rolling surface surrounding an outer peripheral side of the ball passage; and the other one of the two arm parts.

With the configuration described above, when a load in a first vertical direction acts on the circulation component, a caulking part is hooked by the recessed part. Thus, the circulation component is not displaced in the first vertical direction. That is, the circulation component is not detached from the nut main body. If joining between an inner peripheral side component and an outer peripheral side component is released, each of the inner peripheral side component and the outer peripheral side component has one arm part. Thus, each of the inner peripheral side component and the outer peripheral side component does not fall down to the through hole, and is not detached from the nut main body. The circulation component according to the present disclosure is constituted of two components (the inner peripheral side component and the outer peripheral side component), but division surfaces of the two components are not orthogonal to the axial direction. Assuming that the division surface of the circulation component is oriented in a direction orthogonal to the axial direction, a tongue is divided in the axial direction, and strength of the tongue is lowered. On the other hand, the tongue according to the present disclosure is disposed integrally with the inner peripheral side component without being divided. Accordingly, the strength of the tongue is maintained, and the ball can be smoothly scooped up.

To achieve the above object, a nut according to a second aspect of the present disclosure comprising: a nut main body having a cylindrical shape through which a screw shaft passes; and a circulation component assembled to the nut main body, wherein the nut main body comprises: a housing part that is an indentation disposed on an outer peripheral surface of the nut main body and has a bow shape when viewed from an axial direction parallel with the screw shaft;

a seat surface forming a bottom surface of the housing part; a through hole passing through the seat surface and an inner peripheral surface of the nut main body; and a pair of side surfaces opposed to each other that are arranged on both sides in the axial direction parallel with the screw shaft with respect to the housing part, a direction parallel with the seat surface when viewed from the axial direction is a seat surface direction, a direction perpendicular to the seat surface, which is the direction that the seat surface faces, is a first vertical direction, the circulation component comprises: a circulation component main body arranged in the housing part and the through hole; two arm parts extending from the circulation component main body toward both sides in the seat surface direction, and abutting on the seat surface; ribs projecting from the respective two arm parts in the first vertical direction, and extending in the seat surface direction along the side surface; and a caulking part obtained by caulking at least part of the rib toward the side surface, a recessed part as a groove extending in the seat surface direction and being opposed to the rib in the axial direction is disposed on each of the pair of side surfaces, the recessed part that the caulking part enters, a ball passage extending in a tangential direction with respect to a raceway for a ball is disposed on the circulation component main body, the circulation component is obtained by joining an inner peripheral side component to an outer peripheral side component that are divided at a division surface extending along the ball passage when viewed from the axial direction, the inner peripheral side component comprises: a tongue that scoops up the ball from the raceway; an inner peripheral side rolling surface surrounding an inner peripheral side of the ball passage; and an inner peripheral side division surface extending along the division surface, the outer peripheral side component comprises: an outer peripheral side rolling surface surrounding an outer peripheral side of the ball passage; the two arm parts; and an outer peripheral side division surface extending along the division surface, a projection projecting in the seat surface direction and extending in the axial direction is disposed on one of the inner peripheral side division surface and the outer peripheral side division surface, and a groove part that is recessed in the seat surface direction and extends in the axial direction with which the projection is engaged is disposed on the other one of the inner peripheral side division surface and the outer peripheral side division surface.

With the configuration described above, when a load in the first vertical direction acts on the circulation component, the caulking part is hooked by the recessed part. Thus, the circulation component is not displaced in the first vertical direction. That is, the circulation component is not detached from the nut main body. Assuming that joining between the inner peripheral side component and the outer peripheral side component is released, the outer peripheral side component includes two arm parts. Thus, the outer peripheral side component does not fall down to the through hole, and is not detached from the nut main body. On the other hand, regarding the inner peripheral side component, a projection thereof is hooked by a groove part, so that the inner peripheral side component is not displaced in a direction parallel to a perpendicular with respect to a seat surface. Thus, the inner peripheral side component does not fall down to the through hole. The tongue according to the present disclosure is disposed integrally with the inner peripheral side component without being divided. Accordingly, the strength of the tongue is maintained, and the ball can be smoothly scooped up.

As a preferable aspect of the nut described above, the division surface includes: an oblique surface along a direction parallel with the tangential direction when viewed from the axial direction, the oblique surface positioned to be closer to one side in the seat surface direction toward the first vertical direction; and a vertical surface that is arranged to be closer to one side in the seat surface direction than the oblique surface, and extends in the first vertical direction, the projection and the groove part are disposed on the vertical surface, and movement of the inner peripheral side component is regulated by the oblique surface, the movement in a direction of releasing engagement between the projection and the groove part.

With the configuration described above, if joining between the inner peripheral side component and the outer peripheral side component is released, engagement between the projection and the groove part is not released. Thus, the inner peripheral side component does not fall down to the through hole.

As a preferable aspect of the nut described above, the pair of side surfaces include: a first side surface arranged on one side in the axial direction with respect to the circulation component; and a second side surface arranged on the other side in the axial direction with respect to the circulation component, the rib includes: a first rib extending along the first side surface; and a second rib extending along the second side surface, and the caulking part includes: a first caulking part that is part of the first rib and caulked to the first side surface; and a second caulking part that is part of the second rib and caulked to the second side surface.

With the configuration described above, there are a large number of caulking parts hooked by the nut main body, so that the circulation component can be firmly prevented from slipping off.

As a preferable aspect of the nut described above, the seat surface includes an expanded seat surface that is an edge of the through hole, and arranged in the axial direction with respect to the through hole, and the inner peripheral side component includes an expanded seated surface abutting on the expanded seat surface.

With the configuration described above, the number of parts abutting on the seat surface is increased. Accordingly, an attitude of the circulation component is further stabilized, and the ball is smoothly scooped up. If joining between the inner peripheral side component and the outer peripheral side component is released, an expanded seated surface is hooked by an expanded seat surface, so that the inner peripheral side component does not fall down to the through hole.

As a preferred aspect of the nut described above, each of the inner peripheral side rolling surface of the inner peripheral side component of the circulation component and the outer peripheral side rolling surface of the outer peripheral side component is a groove surface.

With the configuration described above, the ball smoothly rolls in the ball passage.

As a preferable aspect of the nut described above, the outer peripheral side rolling surface is a plane.

With the configuration described above, manufacture of the outer peripheral side component is facilitated.

As a preferable aspect of the nut described above, the nut main body includes a positioning hole that is recessed in the axial direction from the side surface, and opens to an outer peripheral surface of the nut main body, and the circulation component main body includes a positioning projection projecting in the axial direction to be inserted into the positioning hole.

With the configuration described above, the circulation component is not displaced in the seat surface direction.

Further, to achieve the above object, a ball screw device according to an aspect of the present disclosure comprising: the nut described above; a screw shaft passing through the nut; and a plurality of balls arranged between the nut and the screw shaft.

With the ball screw device described above, the circulation component is not detached from the nut main body.

Advantageous Effects of Invention

With the nut and the ball screw device according to the present disclosure, the pin for fixing the circulation component is not required, and increase in the number of components can be suppressed.

BRIEF DESCRIPTION OF DRAWINGS

FIG. 1 is a side view of a ball screw device according to a first embodiment viewed from a direction orthogonal to an axial direction.

DESCRIPTION OF EMBODIMENTS

Figure 2:
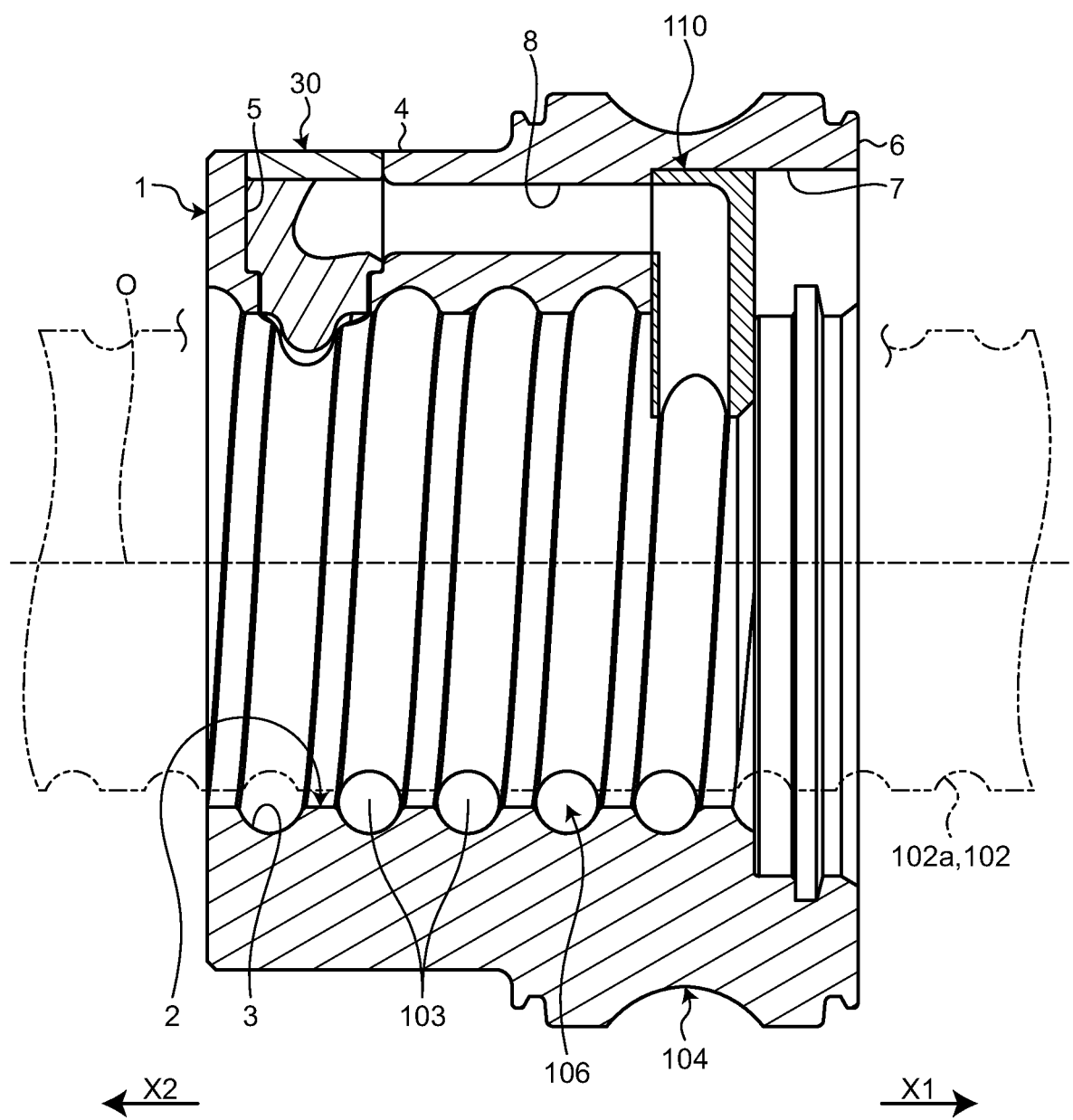
FIG. 2 is a cross-sectional view of a nut according to the first embodiment cut along the axial direction.

The following describes a mode for carrying out the invention in detail with reference to the drawings. The present disclosure is not limited to the content described below. Constituent elements described below encompass a constituent element that is easily conceivable by those skilled in the art, and substantially the same constituent element. Furthermore, the constituent elements described below can be appropriately combined with each other.

First Embodiment

FIG. 1 is a side view of a ball screw device according to a first embodiment viewed from a direction orthogonal to an axial direction. As illustrated in FIG. 1, a ball screw device 100 includes a nut 101, a screw shaft 102 passing through the nut 101, and a plurality of balls 103 (refer to FIG. 2) arranged between the nut 101 and the screw shaft 102. The screw shaft 102 is a cylindrical component manufactured with a steel material. A spiral-shaped outer peripheral raceway surface 102a is disposed on an outer peripheral surface of the screw shaft 102. Hereinafter, a direction parallel with an axis O of the screw shaft 102 is referred to as an axial direction.

The ball screw device 100 is a device that converts rotational motion into linear motion, or converts linear motion into rotational motion. In the present embodiment, an inner ring 104 is disposed on an outer peripheral surface of the nut 101. The inner ring 104 is arranged to be close to an end in the axial direction of the outer peripheral surface of the nut 101. Hereinafter, when viewed from a center part in the axial direction of the nut 101, a direction in which the inner ring 104 is arranged is referred to as a first axial direction (one side of the axial direction) X1. An opposite direction of the first axial direction X1 is referred to as a second axial direction (the other side of the axial direction) X2.

The inner ring 104 is a component of a bearing that supports the nut 101 in a rotatable manner. An outer peripheral raceway surface 105 on which the ball rolls is disposed on an outer peripheral surface of the inner ring 104. Thus, in the present embodiment, the nut 101 is supported by a housing and the like (not illustrated) in a rotatable manner, and the screw shaft 102 linearly moves in the axial direction. That is, the ball screw device 100 according to the present embodiment has a specification for converting rotational motion into linear motion. The present embodiment exemplifies the nut with which the inner ring is integrally formed, but a nut with which an inner ring is not integrally formed may be used in the present disclosure. The present disclosure may also be applied to a ball screw device that converts linear motion into rotational motion.

FIG. 2 is a cross-sectional view of the nut according to the first embodiment cut along the axial direction. As illustrated in FIG. 2, the nut 101 includes a nut main body 1, and a middle deflector (circulation device) 30 and an end deflector 110 assembled to the nut main body 1.

The nut main body 1 is a component having a cylindrical shape manufactured with a steel material. A spiral-shaped inner peripheral raceway surface 3 is disposed on an inner peripheral surface 2 of the nut main body 1. A space between the inner peripheral raceway surface 3 and the outer peripheral raceway surface 102a is a spiral-shaped raceway 106. The balls 103 are arranged on the raceway 106. When the nut 101 rotates, the ball 103 rolls on the inner peripheral raceway surface 3 and the outer peripheral raceway surface 102a to move in a spiral direction along the raceway 106.

At a part close to an end in the second axial direction X2 of an outer peripheral surface 4 of the nut main body 1, disposed is a first housing part (housing part) 5 that is recessed inwardly in a radial direction from the outer peripheral surface 4 of the nut main body 1. On an end face 6 in the first axial direction X1 of the nut main body 1, disposed is a second housing part 7 that is recessed in the second axial direction X2. On the nut main body 1, disposed is a return path 8 that passes therethrough in the axial direction and communicates between the first housing part 5 and the second housing part 7. The middle deflector 30 is housed in the first housing part 5. The end deflector 110 is housed in the second housing part 7.

At the time when the ball screw device 100 is driven, the ball 103 that has moved in the second axial direction X2 along the raceway 106 is scooped up by the middle deflector 30, and guided to the return path 8. The ball 103 rolls in the return path 8 in the first axial direction X1, and enters an inner part of the end deflector 110. The end deflector 110 then circulates the ball 103 to an end in the first axial direction X1 of the raceway 106. In a case in which a rotation direction of the nut 101 is reversed, the end deflector 110 scoops up the ball 103 from the raceway 106, and the middle deflector 30 circulates the ball 103 to a rolling path. Due to this, the ball 103 continuously rolls on the raceway 106.

In the present embodiment, the middle deflector 30 and the end deflector 110 are provided as two circulation components, but both of the two circulation components may be middle deflectors (circulation components) in the present disclosure. Next, the following describes details about the nut main body 1 and the middle deflector 30.

Figure 3:
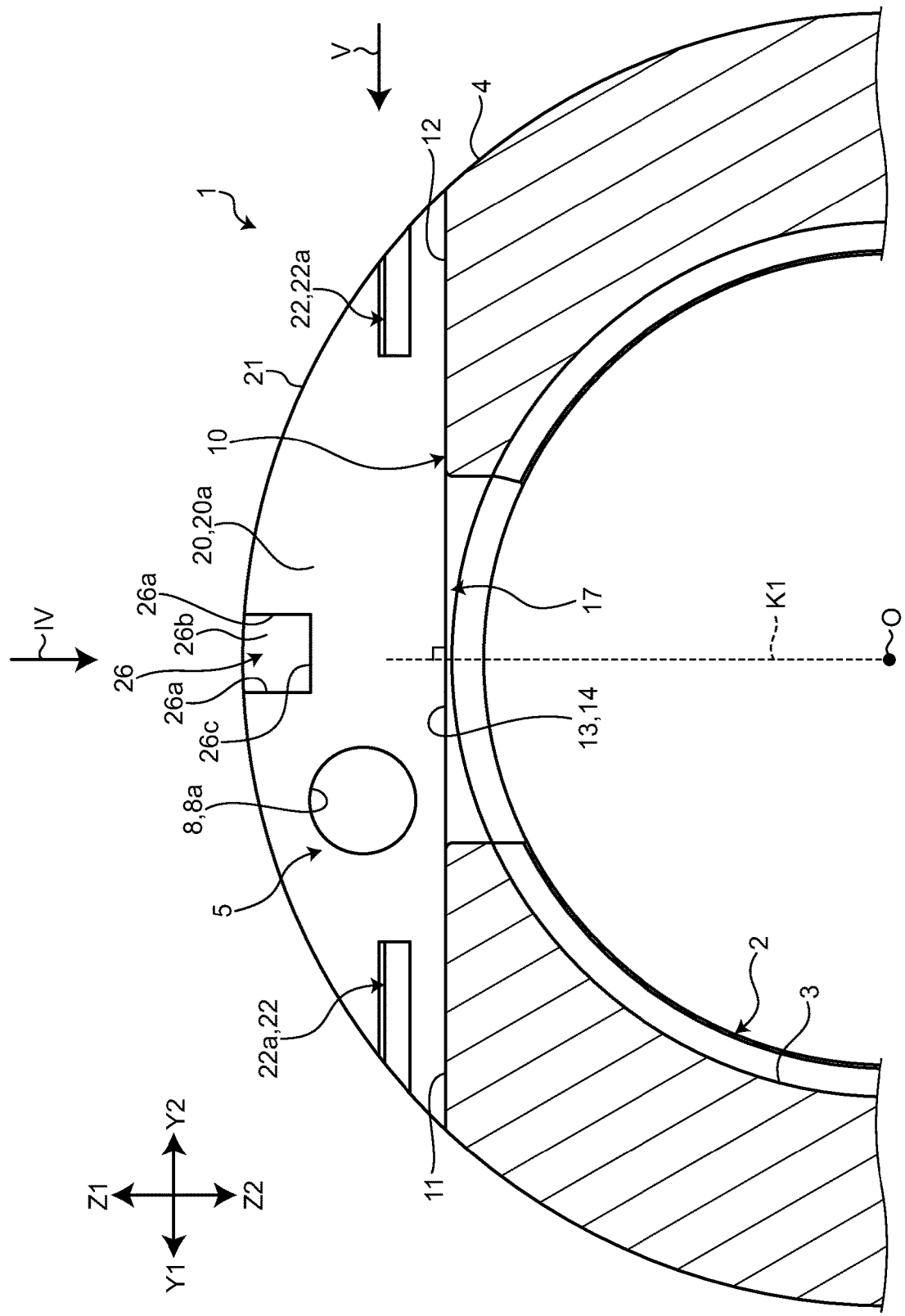
FIG. 3 is a cross-sectional view of a nut main body cut along a line III-III in FIG. 1, the cross section of which being viewed from an arrow direction.

FIG. 3 is a cross-sectional view of the nut main body cut along a line III-III in FIG. 1, the cross section of which being viewed from an arrow direction. As illustrated in FIG. 3, the nut main body 1 includes the first housing part 5, a seat surface 10 forming a bottom surface of the first housing part 5, a through hole 17 passing through the seat surface 10, and a pair of side surfaces 20 (only one of them is illustrated in FIG. 3) arranged on both sides in the axial direction of the first housing part 5.

The first housing part 5 is a space having a bow shape when viewed from the axial direction. The bow shape is a shape obtained by combining a circular arc part overlapping with the outer peripheral surface 4 of the nut main body 1 and a linear part (a linear part connecting between both ends of the circular arc part) overlapping with the seat surface 10 when viewed from the axial direction.

The seat surface 10 is a surface on which the middle deflector 30 abuts (is seated). The seat surface 10 is a plane orthogonal to a virtual line K1 extending from the axis O in the radial direction when viewed from the axial direction. Hereinafter, when viewed from the axial direction, a direction in which the seat surface 10 extends (a direction orthogonal to each of the virtual line K1 and the axial direction) is referred to as a seat surface direction. On the other hand, a direction parallel with the virtual line K1 (a direction perpendicular to the seat surface) is referred to as a vertical direction. One side of the vertical direction that the seat surface 10 faces is referred to as a first vertical direction Z1. An opposite direction of the first vertical direction Z1 is referred to as a second vertical direction Z2. In the present embodiment, the seat surface 10 (first housing part 5) extends in a direction orthogonal to the axis O when viewed from an outer peripheral side (refer to FIG. 4).

The through hole 17 extends in the vertical direction, and passes through the seat surface 10 and the inner peripheral surface 2 of the nut main body 1. The through hole 17 passes through a center part in the seat surface direction of the seat surface 10. Thus, the seat surface 10 is partitioned into a first seat surface 11 arranged on one side of the seat surface direction with respect to the through hole 17 and a second seat surface 12 arranged on the other side of the seat surface direction with respect to the through hole 17. Hereinafter, regarding the seat surface direction, a direction in which the first seat surface 11 is arranged when viewed from the through hole 17 is referred to as a first seat surface direction Y1. An opposite direction of the first seat surface direction Y1 is referred to as a second seat surface direction Y2.

Figure 4:
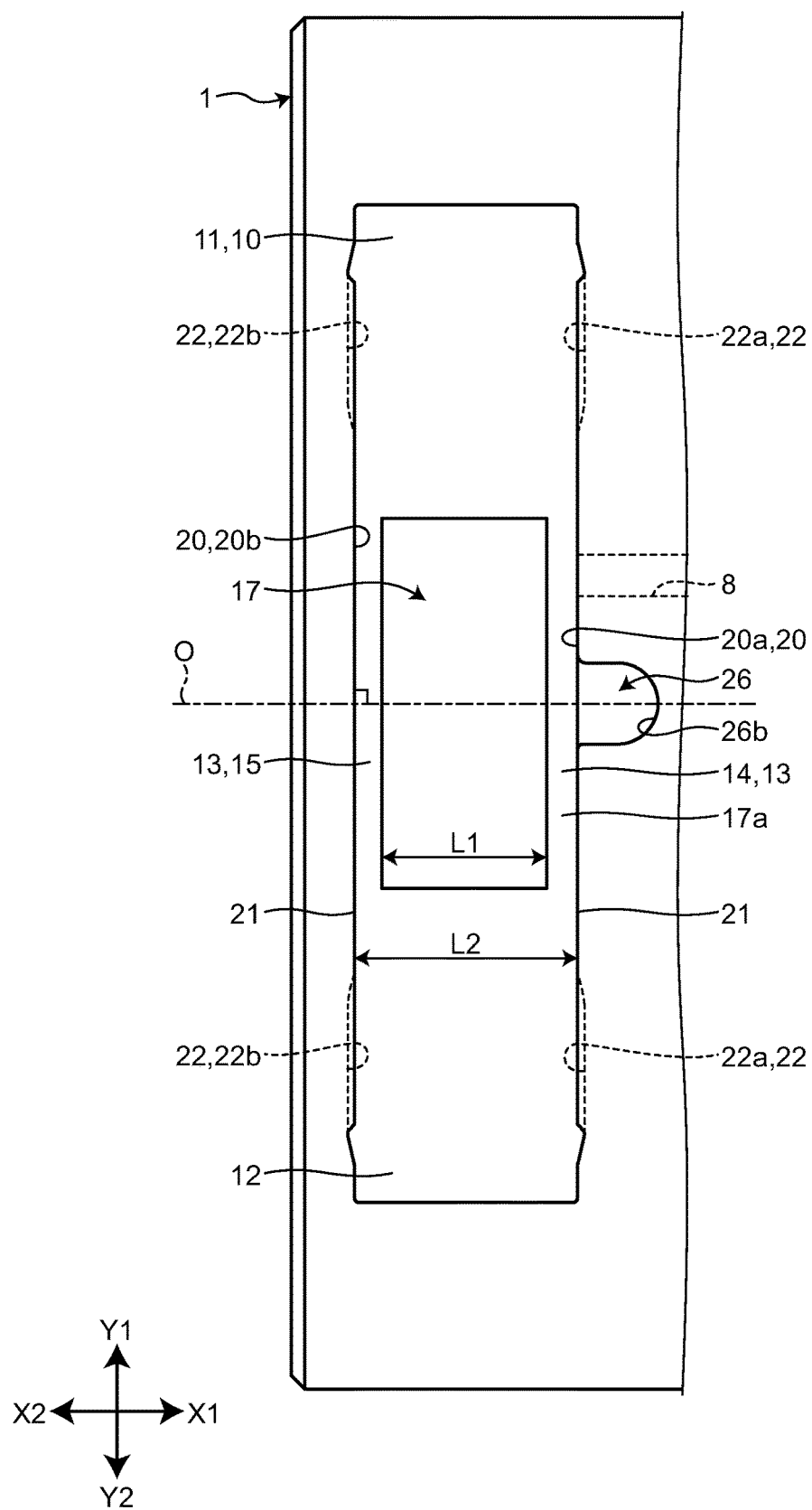
FIG. 4 is a side view viewed from an arrow IV direction in FIG. 3.

FIG. 4 is a side view viewed from an arrow IV direction in FIG. 3. As illustrated in FIG. 4, the through hole 17 has a rectangular shape when viewed from the first vertical direction Z1. The through hole 17 passes through a center part in the axial direction of the seat surface 10. A length L1 in the axial direction of the through hole 17 is shorter than a length L2 in the axial direction of the seat surface 10. Thus, the seat surface 10 includes an expanded seat surface 13 that forms an edge 17a of the through hole 17 and is adjacent to both sides in the axial direction of the through hole 17. Each of four corner parts of the through hole 17 according to the present embodiment has a right-angled shape, but may be a corner R part. The through hole 17 does not necessarily have a rectangular shape.

The expanded seat surface 13 includes a first expanded seat surface 14 arranged in the first axial direction X1 with respect to the through hole 17, and a second expanded seat surface 15 arranged in the second axial direction X2 with respect to the through hole 17. Each of the first expanded seat surface 14 and the second expanded seat surface 15 extends in the seat surface direction, and both ends thereof are connected to the first seat surface 11 and the second seat surface 12, respectively.

The expanded seat surface 13 is not necessarily continued in the seat surface direction as in the embodiment. It is sufficient that the middle deflector 30 can abut (be seated) on the expanded seat surface 13. Thus, the expanded seat surface according to the present disclosure may be an expanded seat surface the part of which in the seat surface direction is notched, the expanded seat surface not continuing in the seat surface direction.

As illustrated in FIG. 4, the pair of side surfaces 20 includes a first side surface 20a arranged in the first axial direction X1 with respect to the seat surface 10, and a second side surface 20b arranged in the second axial direction X2 with respect to the seat surface 10. The first side surface 20a and the second side surface 20b are opposed to each other in the axial direction. The following describes details about the pair of side surfaces 20, but technical content common to the first side surface 20a and the second side surface 20b will be described using the "side surface 20" as a subject. Technical content for the first side surface 20a or the second side surface 20b will be described using the "first side surface 20a" or the "second side surface 20b" as a subject.

As illustrated in FIG. 3, the side surface 20 has a bow shape. Thus, the side surface 20 has an outer peripheral edge part 21 having a circular arc shape. On the side surface 20, disposed is a recessed part 22 that is recessed in the axial direction from the side surface 20 and extends in the seat surface direction. One end of the recessed part 22 extends to the outer peripheral edge part 21. Thus, the recessed part 22 is opened toward the first housing part 5 and an outer peripheral side of the nut main body 1.

Two recessed parts 22 are disposed for the one side surface 20. One of the two recessed parts 22 is arranged in the first seat surface direction Y1 with respect to the through hole 17, and is opened in the first seat surface direction Y1 by notching the outer peripheral edge part 21. The other one of the two recessed parts 22 is arranged in the second seat surface direction Y2 with respect to the through hole 17, and is opened in the second seat surface direction Y2 by notching the outer peripheral edge part 21. That is, the two recessed parts 22 disposed on the one side surface 20 are distributed to one side and the other side in the seat surface direction across the through hole 17 as a boundary.

Figure 5:
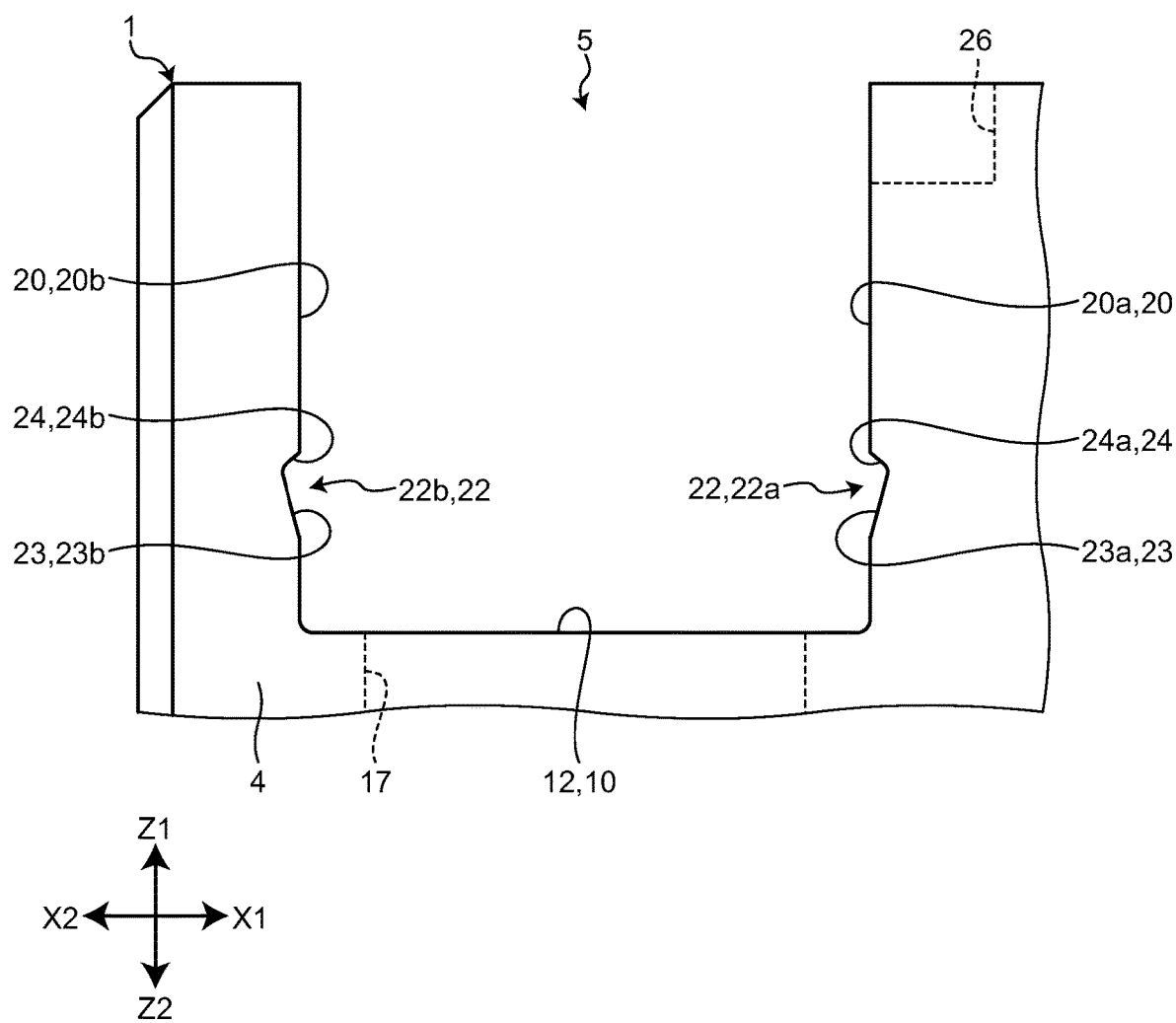
FIG. 5 is a side view viewed from an arrow V direction in FIG. 3.

FIG. 5 is a side view viewed from an arrow V direction in FIG. 3. The recessed part 22 is separated from the seat surface 10 in the first vertical direction Z1. A cross-sectional shape of the recessed part 22 is a triangular shape. Thus, an inner surface of the recessed part 22 includes a first oblique surface 23 that becomes more distant from the first housing part 5 toward the first vertical direction Z1, and a second oblique surface 24 that comes closer to the first housing part 5 toward the first vertical direction Z1.

Hereinafter, the recessed part 22 disposed on the first side surface 20a is referred to as a first recessed part 22a, and the recessed part 22 disposed on the second side surface 20b is referred to as a second recessed part 22b. The first oblique surface 23 and the second oblique surface 24 disposed on the first recessed part 22a are assumed to be a first oblique surface 23a and a second oblique surface 24a, respectively. The first oblique surface 23 and the second oblique surface 24 disposed on the first recessed part 22a are assumed to be a first oblique surface 23b and a second oblique surface 24b, respectively.

As illustrated in FIG. 3, an opening 8a as an entrance and exit of the return path 8, and a positioning hole 26 are disposed on the first side surface 20a. The positioning hole 26 is a hole that is recessed in the first axial direction X1 from the first side surface 20a. The positioning hole 26 is also opened toward the outer peripheral surface 4 of the nut main body 1. An inner surface of the positioning hole 26 includes a pair of opposing surfaces 26a holding the positioning hole 26 in the seat surface direction, a side surface 26b arranged in the first axial direction X1 with respect to the positioning hole 26, and a bottom surface 26c arranged in the second vertical direction Z2 with respect to the positioning hole 26. Next, the following describes the middle deflector 30.

Figure 6:
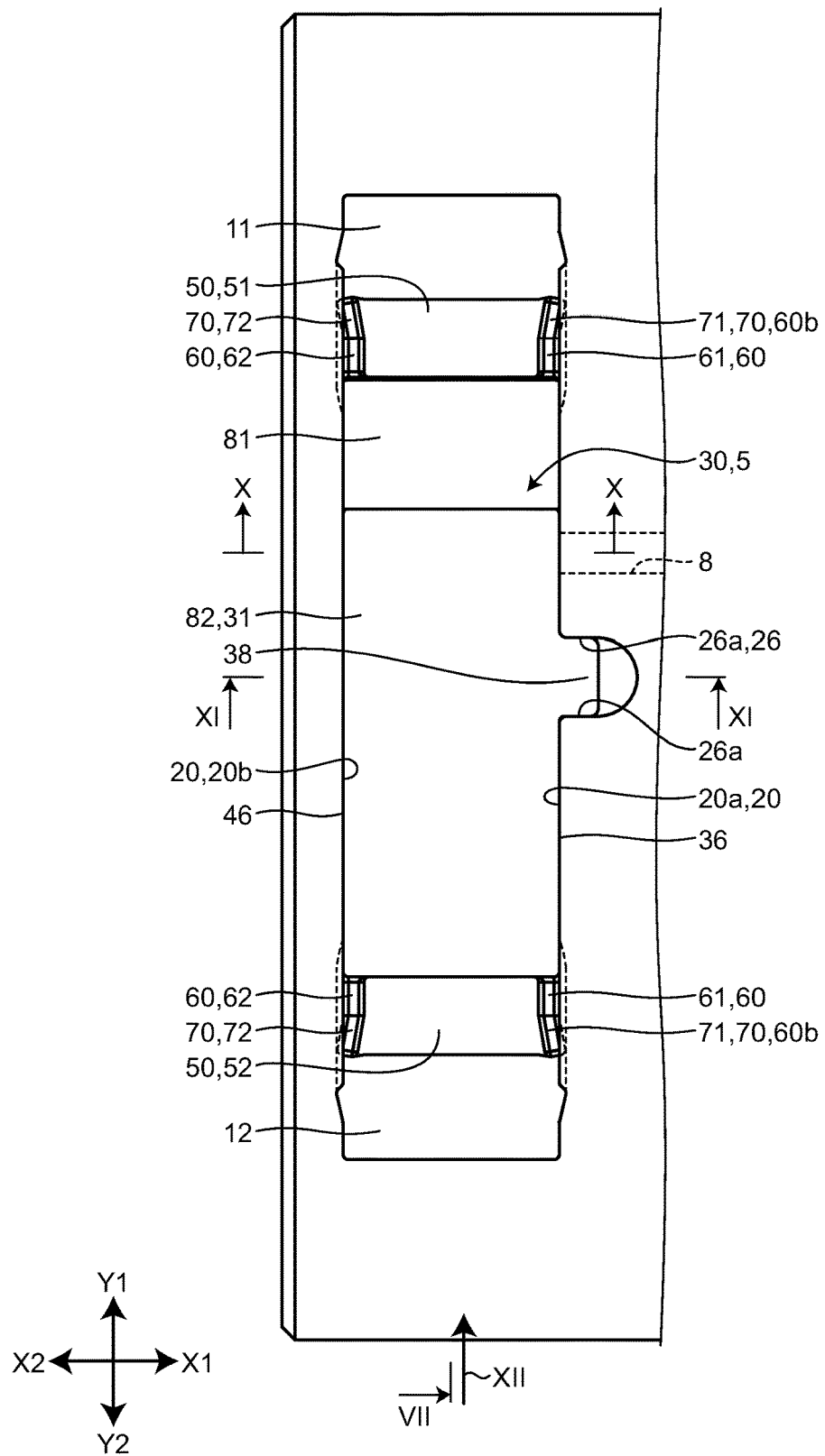
FIG. 6 is an enlarged view of a middle deflector in FIG. 1 and the surroundings thereof.

FIG. 6 is an enlarged view of the middle deflector in FIG. 1 and the surroundings thereof. The middle deflector 30 is a component made of metal manufactured by using a method such as a metal powder injection molding method, cutting work, or forging. As illustrated in FIG. 6, the middle deflector 30 is arranged in the first housing part 5. Thus, when viewed from the outer peripheral side, the middle deflector 30 extends in the same direction (a direction orthogonal to the axis O, refer to FIG. 4) as the first housing part 5 (seat surface 10). The middle deflector 30 includes a deflector main body (circulation component main body) 31, an arm part 50 projecting from the deflector main body 31 in the seat surface direction, a rib 60 projecting from the arm part 50 in the first vertical direction Z1, and a caulking part 70 caulking part of the rib 60. The caulking part 70 is generated by caulking the rib 60 at the time of assembling the middle deflector 30 to the nut main body 1. Thus, the caulking part 70 is not illustrated in the drawing illustrating the middle deflector 30 before assembly.

Figure 7:
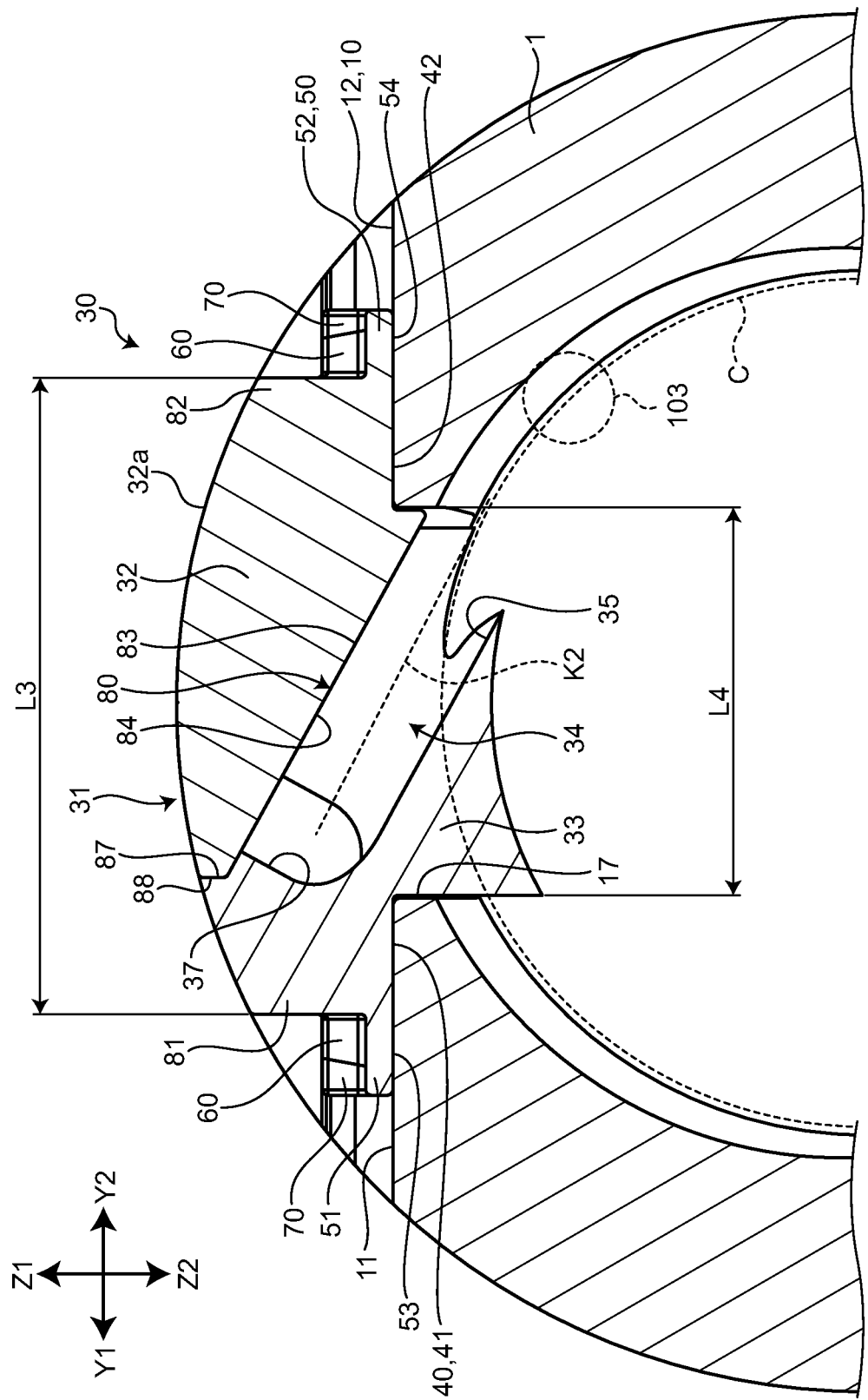
FIG. 7 is a cross-sectional view along arrows of a line VII-VII in FIG. 6.

FIG. 7 is a cross-sectional view along arrows of a line VII-VII in FIG. 6. As illustrated in FIG. 7, a ball passage 34 through which the ball 103 passes is disposed inside the deflector main body 31. The deflector main body 31 includes a main body part 32 arranged in the first housing part 5 and a scoop-up part 33 arranged in the through hole 17. The ball passage 34 extends in a tangential direction (refer to a virtual line K2) of a virtual circle C obtained by connecting centers of the balls 103 on the raceway 106. A tongue 35 for scooping up the ball 103 from the raceway 106 is disposed on the scoop-up part 33.

An outer peripheral surface 32a in the first vertical direction Z1 of the main body part 32 has a circular arc shape. When viewed from the axial direction, the outer peripheral surface 32a of the main body part 32 overlaps with the outer peripheral surface 4 of the nut main body 1. That is, a distance from the axis O to the outer peripheral surface 32a of the middle deflector 30 is the same as an outer diameter of the nut main body 1. Thus, the middle deflector 30 does not project from the first housing part 5.

Figure 8:
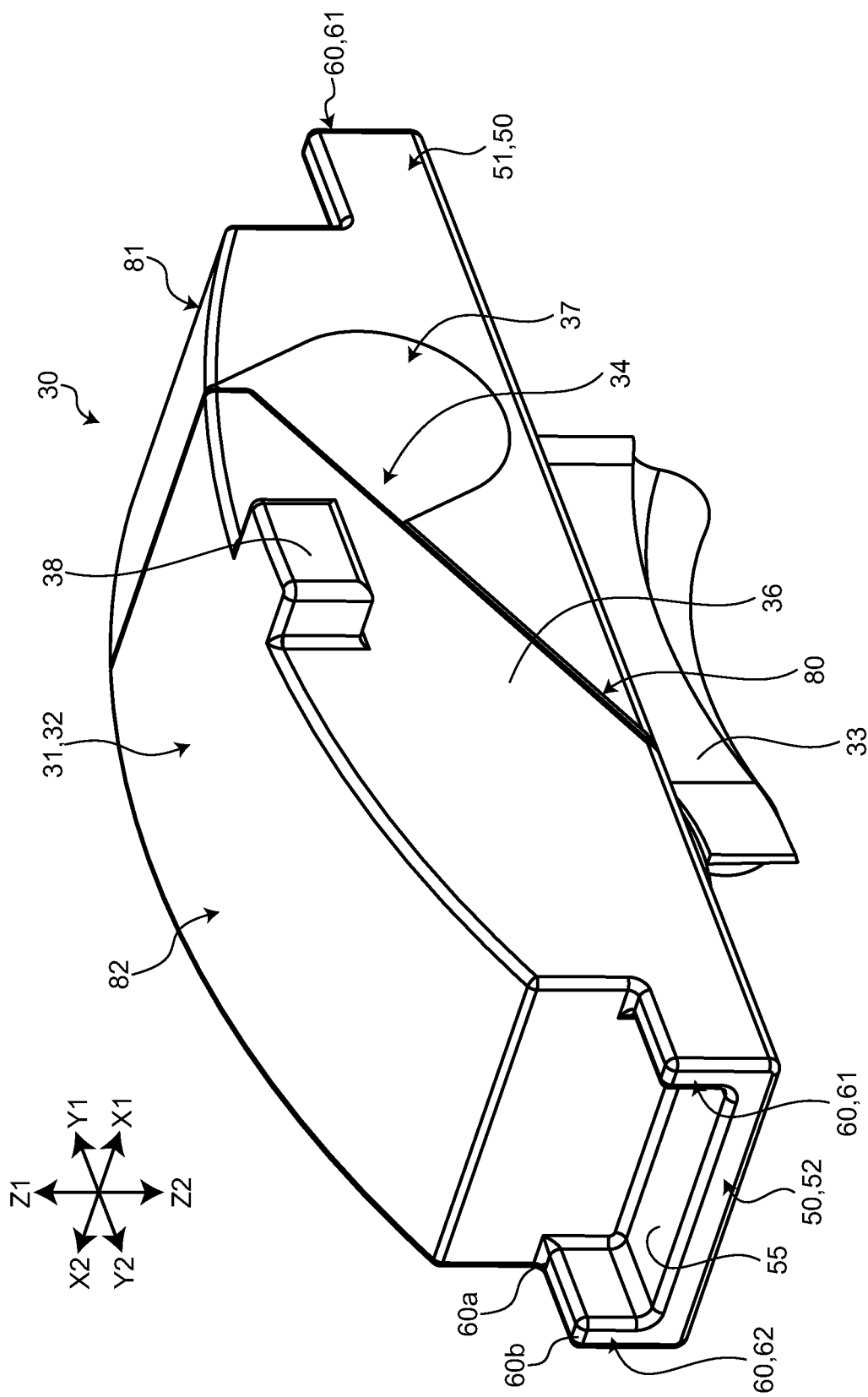
FIG. 8 is a perspective view of the middle deflector before caulking according to the first embodiment obliquely viewed from a first vertical direction.
Figure 9:
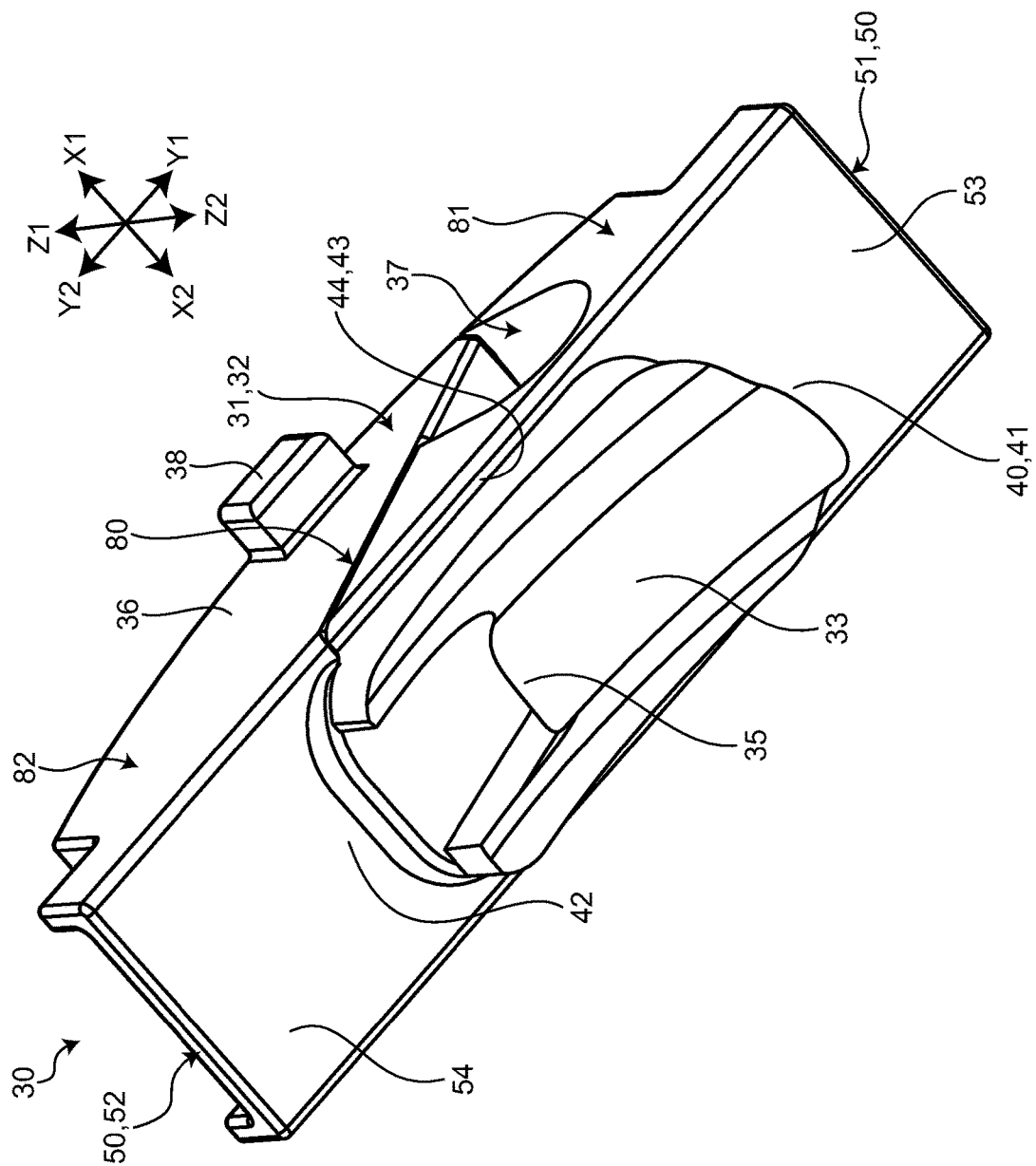
FIG. 9 is a perspective view of the middle deflector before caulking according to the first embodiment obliquely viewed from a second vertical direction.
Figure 10:
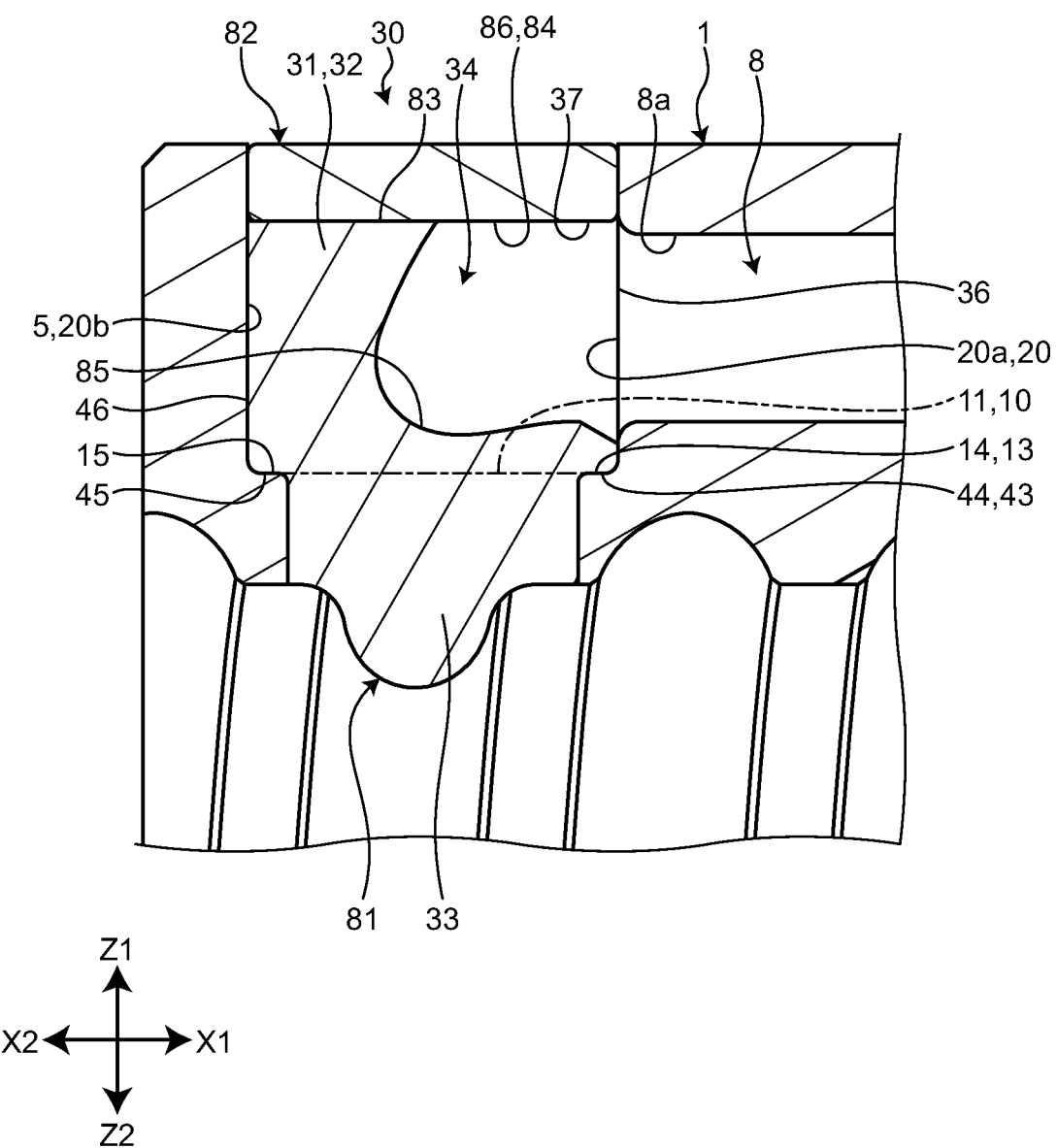
FIG. 10 is a cross-sectional view along arrows of a line X-X in FIG. 6.
Figure 11:
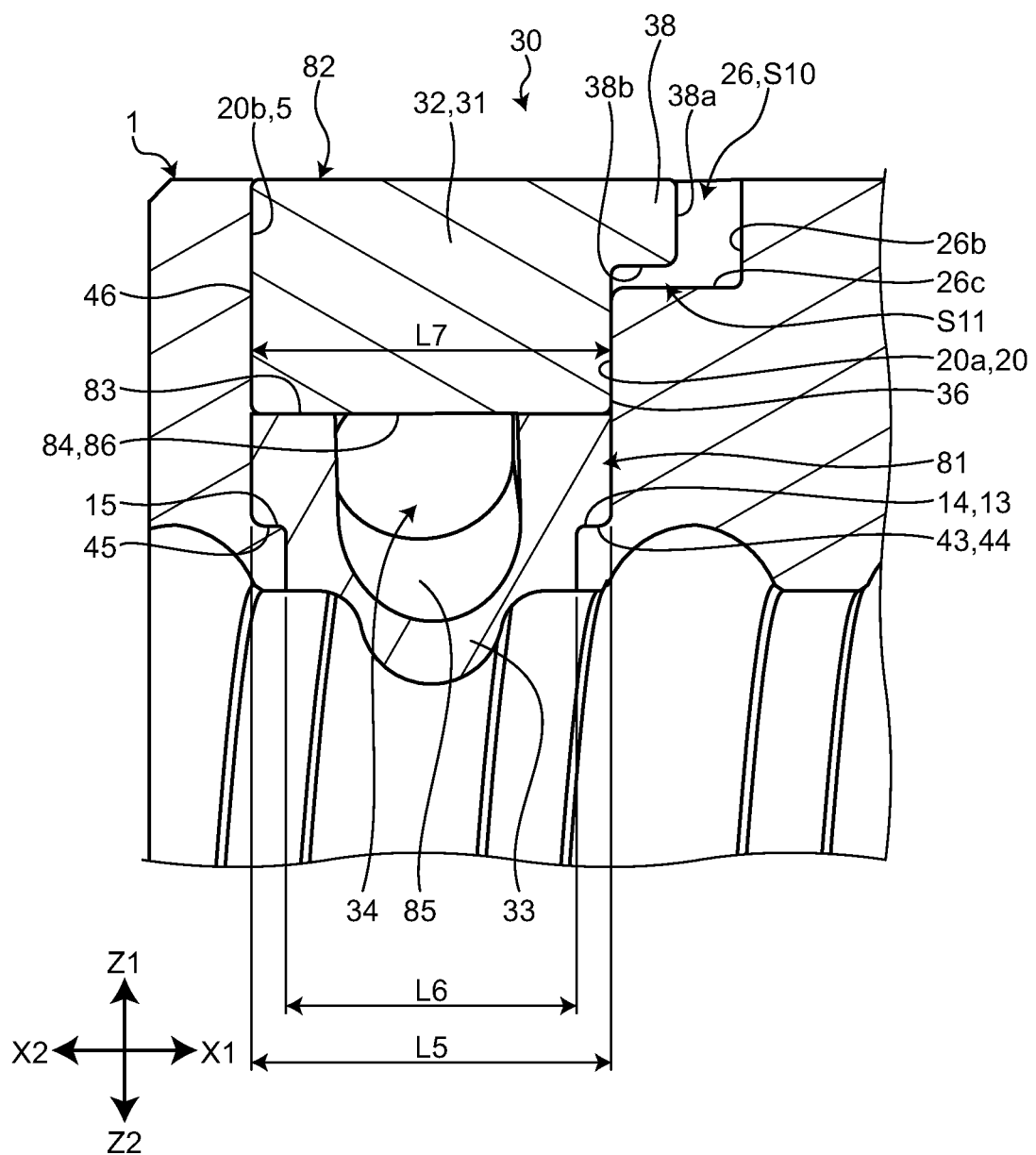
FIG. 11 is a cross-sectional view along arrows of a line XI-XI in FIG. 6.
Figure 12:
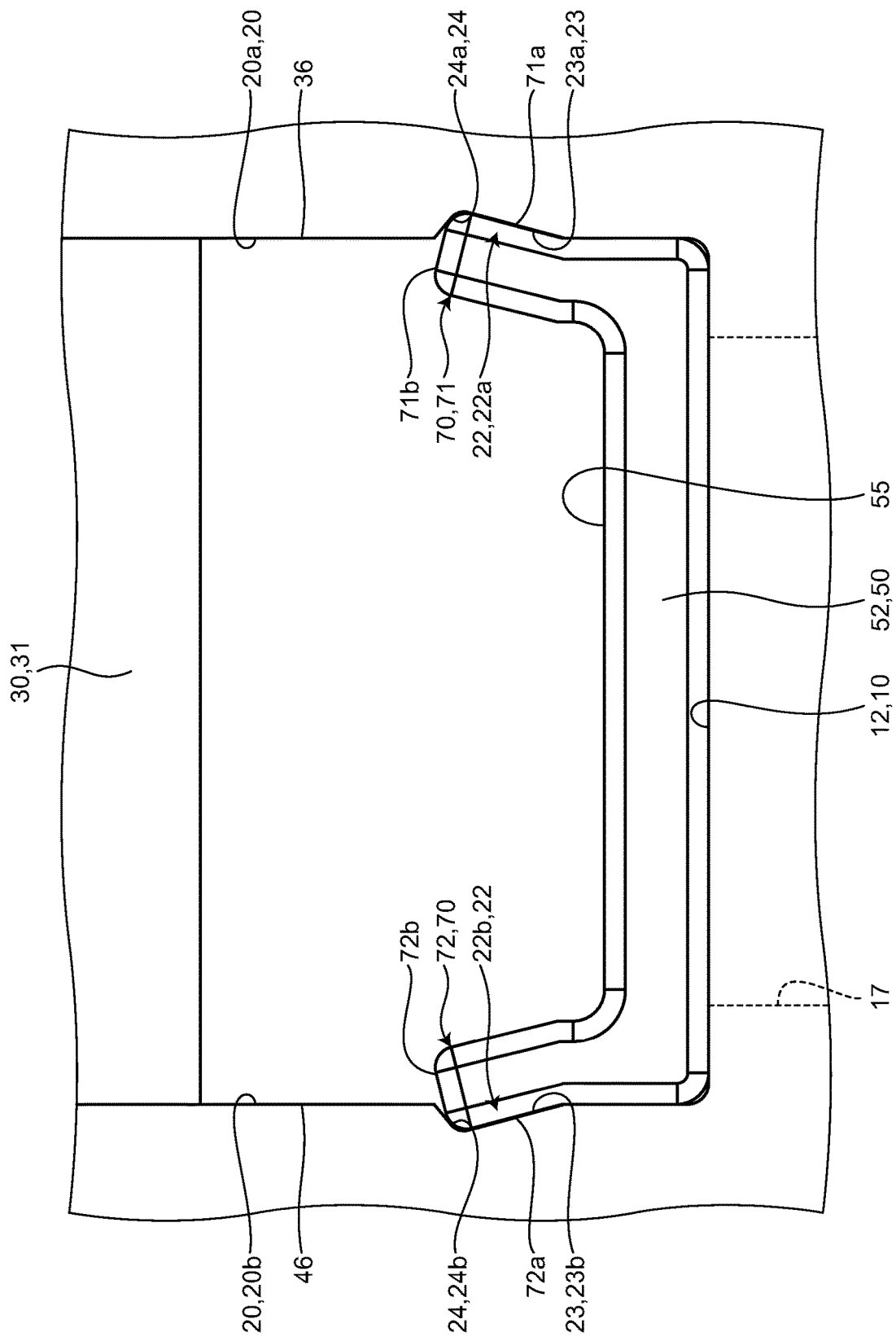
FIG. 12 is a side view viewed from a direction of an arrow XII in FIG. 6.

FIG. 8 is a perspective view of the middle deflector before caulking according to the first embodiment obliquely viewed from the first vertical direction. FIG. 9 is a perspective view of the middle deflector before caulking according to the first embodiment obliquely viewed from the second vertical direction. FIG. 10 is a cross-sectional view along arrows of a line X-X in FIG. 6. FIG. 11 is a cross-sectional view along arrows of a line XI-XI in FIG. 6. FIG. 12 is a side view viewed from an arrow XII direction in FIG. 6.

As illustrated in FIG. 8 and FIG. 9, the main body part 32 includes a first opposing surface 36 as a side surface facing the first axial direction X1. The first opposing surface 36 is opposed to the first side surface 20a. An opening 37 as the entrance and exit of the ball passage 34 is disposed on the first opposing surface 36. As illustrated in FIG. 10, the opening 37 continues (is adjacent) to the opening 8a of the return path 8 in the axial direction. Due to this, the ball 103 can move from the ball passage 34 to the return path 8, or move from the return path 8 to the ball passage 34. To smoothly deliver the ball 103, R-chamfering is performed on the opening 8a and the opening 37 (refer to FIG. 2 and FIG. 10). According to the present disclosure, regarding chamfering of the opening 8a and the opening 37, corner chamfering may be performed instead of R-chamfering.

As illustrated in FIG. 8 and FIG. 9, a positioning projection 38 projecting in the first axial direction X1 is disposed on the first opposing surface 36. The positioning projection 38 has a quadrangular prism shape. As illustrated in FIG. 6, the positioning projection 38 is inserted into the positioning hole 26. The positioning projection 38 abuts on the pair of opposing surfaces 26a of the positioning hole 26. Due to this, the middle deflector 30 is regulated not to be displaced from a predetermined assembly position in the seat surface direction.

As illustrated in FIG. 11, a distal end surface 38a of the positioning projection 38 is separated from the side surface 26b of the positioning hole 26. That is, a gap S10 is generated between the distal end surface 38a and the side surface 26b. Due to this, in a case in which the positioning projection 38 is manufactured to have a larger projecting amount than a predetermined projecting amount, a manufacturing error thereof is absorbed by the gap S10. In other words, it is possible to avoid a situation in which the positioning projection 38 abuts on the side surface 26b of the positioning hole 26, and the first side surface 20a is separated from the first opposing surface 36.

Separation between the first side surface 20a and the first opposing surface 36 causes separation between the opening 8a of the return path 8 and the opening 37 of the ball passage 34, and the ball 103 is not smoothly delivered. Thus, to smoothly deliver the ball 103, it is preferable that the first side surface 20a abuts on the first opposing surface 36.

A bottom surface 38b of the positioning projection 38 is separated from the bottom surface 26c of the positioning hole 26. That is, a gap S11 is generated between the bottom surface 38b and the bottom surface 26c. Due to this, in a case in which the positioning projection 38 is manufactured to have a thickness in the vertical direction larger than a predetermined amount, a manufacturing error thereof is absorbed by the gap S11. Accordingly, it is possible to avoid a situation in which the positioning projection 38 abuts on (is hooked by) a bottom surface 26d of the positioning hole 26, and the middle deflector 30 is not seated (does not abut) on the seat surface 10.

Additionally, the positioning projection 38 and the positioning hole 26 are disposed only in the first axial direction X1 with respect to the middle deflector 30. Due to this, at the time of arranging the middle deflector 30 in the first housing part 5, it is possible to avoid a situation in which the middle deflector 30 is erroneously arranged so that the positioning projection 38 faces the second axial direction X2 (the opening 37 faces the second axial direction).

As illustrated in FIG. 7, a length L3 in the seat surface direction of the main body part 32 is longer than a length L4 in the seat surface direction of the scoop-up part 33. Due to this, the main body part 32 includes a seated surface 40 that faces the second vertical direction Z2 and abuts (is seated) on the seat surface 10. The seated surface 40 includes a first seated surface 41 that abuts on the first seat surface 11 and a second seated surface 42 that abuts on the second seat surface 12. That is, the middle deflector 30 includes seated surfaces 40 on both sides in the seat surface direction across the through hole 17.

As illustrated in FIG. 11, a length L5 in the axial direction of the main body part 32 is longer than a length L6 in the axial direction of the scoop-up part 33. Due to this, the seated surface 40 includes an expanded seated surface 43 arranged in the axial direction with respect to the scoop-up part 33. The expanded seated surface 43 includes a first expanded seated surface 44 arranged in the first axial direction X1 with respect to the scoop-up part 33, and a second expanded seated surface 45 arranged in the second axial direction X2 with respect to the scoop-up part 33. The first expanded seated surface 44 abuts on the first expanded seat surface 14 of the seat surface 10. The second expanded seated surface 45 abuts on the second expanded seat surface 15.

As illustrated in FIG. 11, the main body part 32 includes a second opposing surface 46 as a side surface facing the second axial direction X2. The second opposing surface 46 is opposed to the second side surface 20b. The second opposing surface 46 is a plane. Due to a tolerance, the length L5 in the axial direction of the main body part 32 is slightly smaller than a width L7 in the axial direction of the first housing part 5. That is, a minute gap (not illustrated) is generated between the first side surface 20a and the first opposing surface 36, or between the second side surface 20b and the second opposing surface 46, or between both of them. Due to this, the middle deflector 30 can be securely housed in the first housing part 5.

As illustrated in FIG. 7, the arm part 50 includes a first arm part 51 extending in the first seat surface direction Y1 from the main body part 32 and a second arm part 52 extending in the second seat surface direction Y2 from the main body part 32. The first arm part 51 includes a first seated surface 53 for the arm part as a side surface facing the second vertical direction Z2. The second arm part 52 includes a second seated surface 54 for the arm part as a side surface facing the second vertical direction Z2. The first seated surface 53 for the arm part abuts on the first seat surface 11. The second seated surface 54 for the arm part abuts on the second seat surface 12.

Next, the following describes the rib 60. As illustrated in FIG. 6, the rib 60 is disposed on each of the first arm part 51 and the second arm part 52. Thus, the following describes the rib 60 disposed on the second arm part 52, but the rib 60 disposed on the first arm part 51 will not be described.

As illustrated in FIG. 8, the rib 60 is a projection that projects from a plane 55 facing the first vertical direction Z1 of the second arm part 52 and extends in a linear shape in the seat surface direction. A length in the seat surface direction of the rib 60 is the same as that of the second arm part 52. An end part in the first seat surface direction Y1 of the rib 60 is connected to the main body part 32 (deflector main body 31). Hereinafter, the end part of the rib 60 connected to the main body part 32 is referred to as a base part 60a, and an end part thereof on the opposite side is referred to as a distal end part 60b.

The rib 60 includes a first rib 61 extending along an edge in the first axial direction X1 of the plane 55, and a second rib 62 extending along an edge in the second axial direction X2 of the plane 55. The first rib 61 extends along the first side surface 20a, and is adjacent to the first recessed part 22a in the axial direction (refer to FIG. 14). The second rib 62 extends along the second side surface 20b, and is adjacent to the second recessed part 22b of the second side surface 20b in the axial direction (refer to FIG. 14).

As illustrated in FIG. 6, the caulking part 70 is formed by caulking the rib 60 extending along the side surface 20 to the side surface 20. The caulking part 70 is disposed only at the distal end part 60b of the rib 60. The caulking part 70 includes a first caulking part 71 disposed on the first rib 61 and a second caulking part 72 disposed on the second rib 62.

As illustrated in FIG. 12, the first caulking part 71 enters the first recessed part 22a. The first caulking part 71 has a shape along an inner surface of the first recessed part 22a. In detail, the first caulking part 71 is inclined to be positioned in the first axial direction X1 toward the first vertical direction Z1 from the plane 55. A side surface 71a facing the first axial direction X1 of the first caulking part 71 abuts on the first oblique surface 23a. An end face 71b facing the first vertical direction Z1 of the first caulking part 71 abuts on the second oblique surface 24a.

The second caulking part 72 enters the second recessed part 22b. The second caulking part 72 has a shape along an inner surface of the second recessed part 22b. Specifically, the second caulking part 72 is inclined to be positioned in the second axial direction X2 toward the first vertical direction Z1 from the plane 55. A side surface 72a facing the second axial direction X2 of the second caulking part 72 abuts on the first oblique surface 23b. An end face 72b facing the first vertical direction Z1 of the second caulking part 72 abuts on the second oblique surface 24b. As described above, the first caulking part 71 and the second caulking part 72 are inclined to be separated from each other in the axial direction toward the first vertical direction Z1.

As illustrated in FIG. 8 and FIG. 9, the middle deflector 30 according to the present embodiment is obtained by combining two components (an inner peripheral side component 81 and an outer peripheral side component 82) divided along a division surface 80. As illustrated in FIG. 7, the division surface 80 extends in the axial direction. When viewed from the axial direction, the division surface 80 is parallel with a tangent line (refer to the virtual line K2) with respect to the virtual circle C. That is, the division surface 80 is inclined to be positioned in the first vertical direction Z1 toward the first seat surface direction Y1. Hereinafter, of the two components constituting the middle deflector 30, the component arranged on an inner peripheral side of the division surface 80 is referred to as the inner peripheral side component 81, and the component arranged on an outer peripheral side of the division surface 80 is referred to as the outer peripheral side component 82.

Configurations of the middle deflector 30 are distributed to the inner peripheral side component 81 and the outer peripheral side component 82 across the division surface 80 as a boundary line. In the present embodiment, the inner peripheral side component 81 includes the first arm part 51, the tongue 35, and the expanded seated surface 43 (refer to FIG. 9). On the other hand, the outer peripheral side component 82 includes the second arm part 52. Hereinafter, an end face of the inner peripheral side component 81 extending along the division surface 80 is referred to as an inner peripheral side division surface 83. An end face of the outer peripheral side component 82 extending along the division surface 80 is referred to as an outer peripheral side division surface 84.

The division surface 80 overlaps with an outer peripheral side of the ball passage 34. Due to this, as illustrated in FIG. 11, an inner peripheral side rolling surface 85 as a C-shaped or U-shaped groove opening in the first vertical direction Z1 is disposed on the inner peripheral side division surface 83 of the inner peripheral side component 81. On the other hand, the outer peripheral side division surface 84 of the outer peripheral side component 82 is a plane. Part of the outer peripheral side division surface 84 forms an outer peripheral side rolling surface 86 that covers the inner peripheral side rolling surface 85 from the first vertical direction Z1. The outer peripheral side division surface 84 is a plane, so that manufacture of the outer peripheral side component 82 is facilitated.

The inner peripheral side component 81 and the outer peripheral side component 82 are separately manufactured. The inner peripheral side division surface 83 is joined to the outer peripheral side division surface 84, and the inner peripheral side component 81 is integrated with the outer peripheral side component 82. As a joining method, heat welding, bonding, and the like can be exemplified.

As illustrated in FIG. 7, an end part in the first seat surface direction Y1 of the division surface 80 extends in the first vertical direction Z1. In other words, on an end part in the first seat surface direction Y1 of the inner peripheral side division surface 83, a stepped surface 87 extending in the first vertical direction Z1 and facing the second seat surface direction is disposed. On the other hand, on an end part in the first seat surface direction Y1 of the outer peripheral side division surface 84, an end face 88 extending in the first vertical direction Z1 and facing the first seat surface direction Y1 is disposed. The stepped surface 87 abuts on the end face 88. Thus, at the time of joining the inner peripheral side component 81 to the outer peripheral side component 82, they are regulated not to be displaced in the seat surface direction.

Next, the following describes an assembling method S for assembling the middle deflector 30 to the nut main body 1. The assembling method S includes a preparation step S1 and a caulking step S2.

Figure 13:
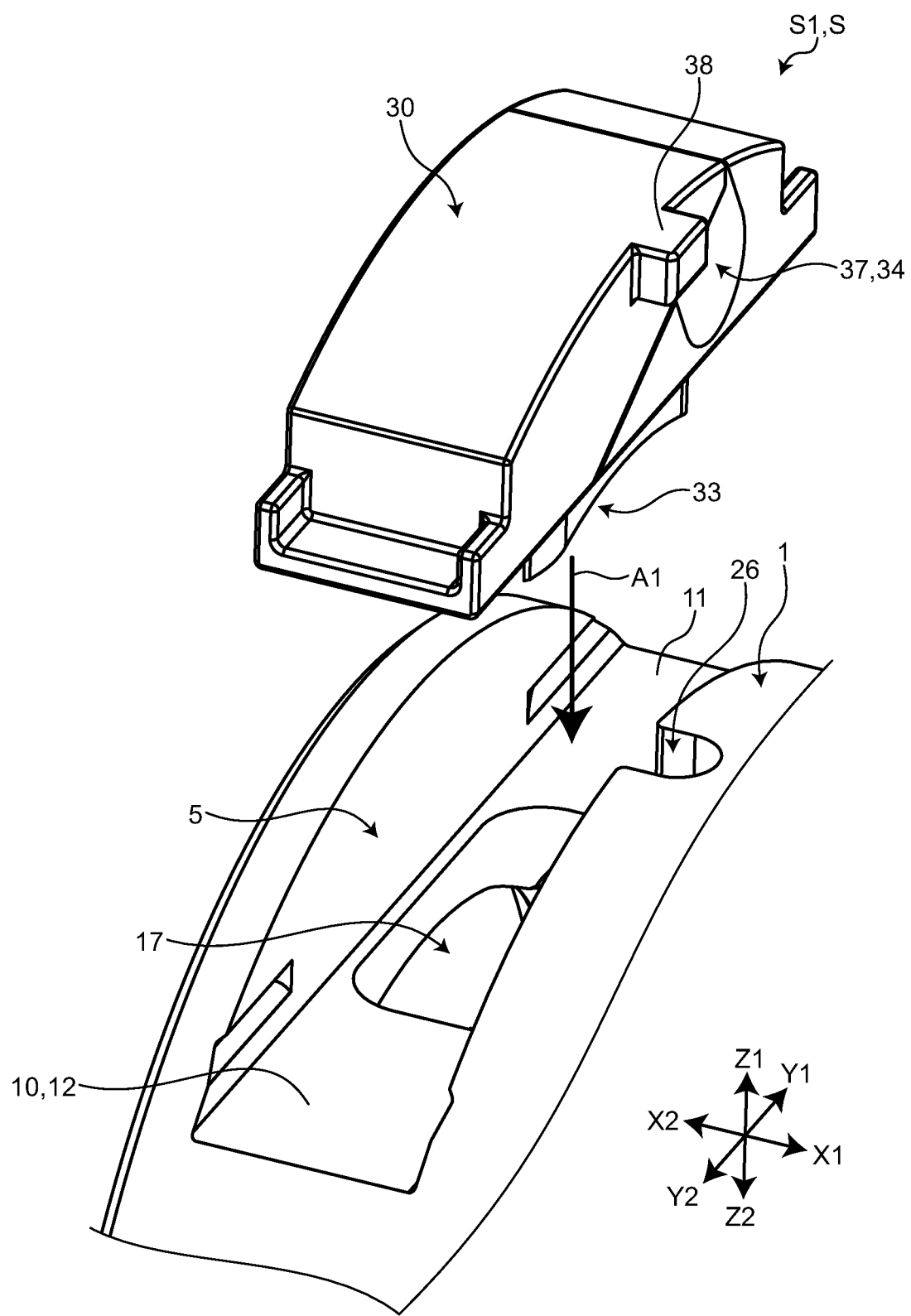
FIG. 13 is a perspective view illustrating a preparation step of an assembling method according to the first embodiment.

FIG. 13 is a perspective view illustrating a preparation step of the assembling method according to the first embodiment. The preparation step S1 is a step of seating the middle deflector 30 on the seat surface 10 of the nut main body 1. Specifically, as illustrated in FIG. 13, first, the middle deflector 30 is arranged in the first vertical direction Z1 of the first housing part 5 of the nut main body 1. An attitude of the middle deflector 30 is set so that the seated surface 40 (not illustrated in FIG. 13) and the scoop-up part 33 faces the first housing part 5. Additionally, the positioning projection 38 of the middle deflector 30 is caused to indicate the first axial direction X1. The middle deflector 30 according to the present embodiment includes the positioning projection 38. However, in a case in which the middle deflector 30 does not include the positioning projection 38, it should be checked whether the opening 37 faces the first axial direction X1 instead of the positioning projection 38.

Next, the middle deflector 30 is moved in the second vertical direction Z2 (refer to an arrow A1 in FIG. 13), and the middle deflector 30 is inserted into the first housing part 5. The position of the middle deflector 30 is adjusted in the axial direction and the seat surface direction so that the scoop-up part 33 is inserted into the through hole 17 and the positioning projection 38 is inserted into the positioning hole 26. After the scoop-up part is inserted into the through hole 17 and the positioning projection 38 is inserted into the positioning hole 26, when the middle deflector 30 is further moved in the second vertical direction Z2, the seated surface 40 of the middle deflector 30 abuts on the seat surface 10. Due to this, the middle deflector 30 is seated on the seat surface 10, and the preparation step S1 ends.

Figure 14:
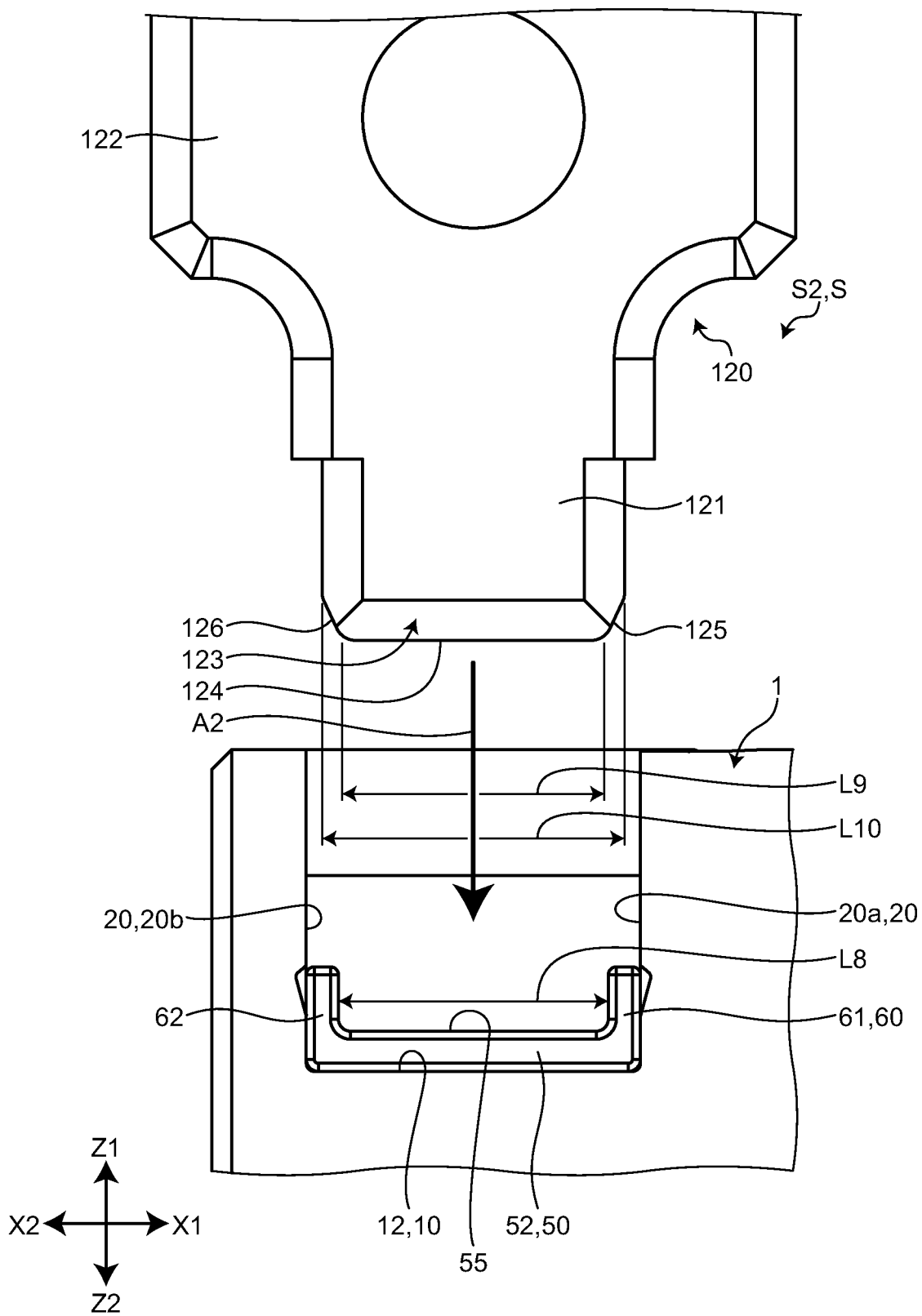
FIG. 14 is a side view of a state before caulking viewed from a second seat surface direction at a caulking step of the assembling method according to the first embodiment.

FIG. 14 is a side view of a state before caulking viewed from the second seat surface direction at the caulking step of the assembling method according to the first embodiment. The caulking step S2 is a step of caulking the rib 60 with a jig 120. As illustrated in FIG. 14, a gap amount in the axial direction between the first rib 61 and the second rib 62 is L8.

The jig 120 includes a head part 121 inserted between the first rib 61 and the second rib 62, and a grasping part 122 arranged in the first vertical direction Z1 of the head part 121. A distal end part 123 is disposed at an end part in the second vertical direction Z2 of the head part 121. A width in the axial direction of the distal end part 123 becomes narrower toward the second vertical direction Z2.

The distal end part 123 includes a distal end surface 124 facing the second vertical direction Z2, a first pressing surface 125 facing the first axial direction X1, and a second pressing surface 126 facing the second axial direction X2. A width L9 in the axial direction of the distal end surface 124 is smaller than a separation distance L8 between the first rib 61 and the second rib 62.

A width in the axial direction between the first pressing surface 125 and the second pressing surface 126 gradually increases toward the first vertical direction Z1, and is L10 at the maximum. The maximum width L10 in the axial direction between the first pressing surface 125 and the second pressing surface 126 is larger than the separation distance L8 between the first rib 61 and the second rib 62.

In a caulking method using the jig 120, first, the distal end part 123 of the jig 120 is inserted between the first rib 61 and the second rib 62 from the first vertical direction Z1 (refer to an arrow A2 in FIG. 14). Due to this, although not particularly illustrated, the distal end surface 124 is inserted between the first rib 61 and the second rib 62, the first pressing surface 125 abuts on the first rib 61, and the second pressing surface 126 abuts on the second rib 62. The distal end surface 124 is caused to be in a state of floating above (being separated from) the plane 55 of the arm part 50.

Figure 15:
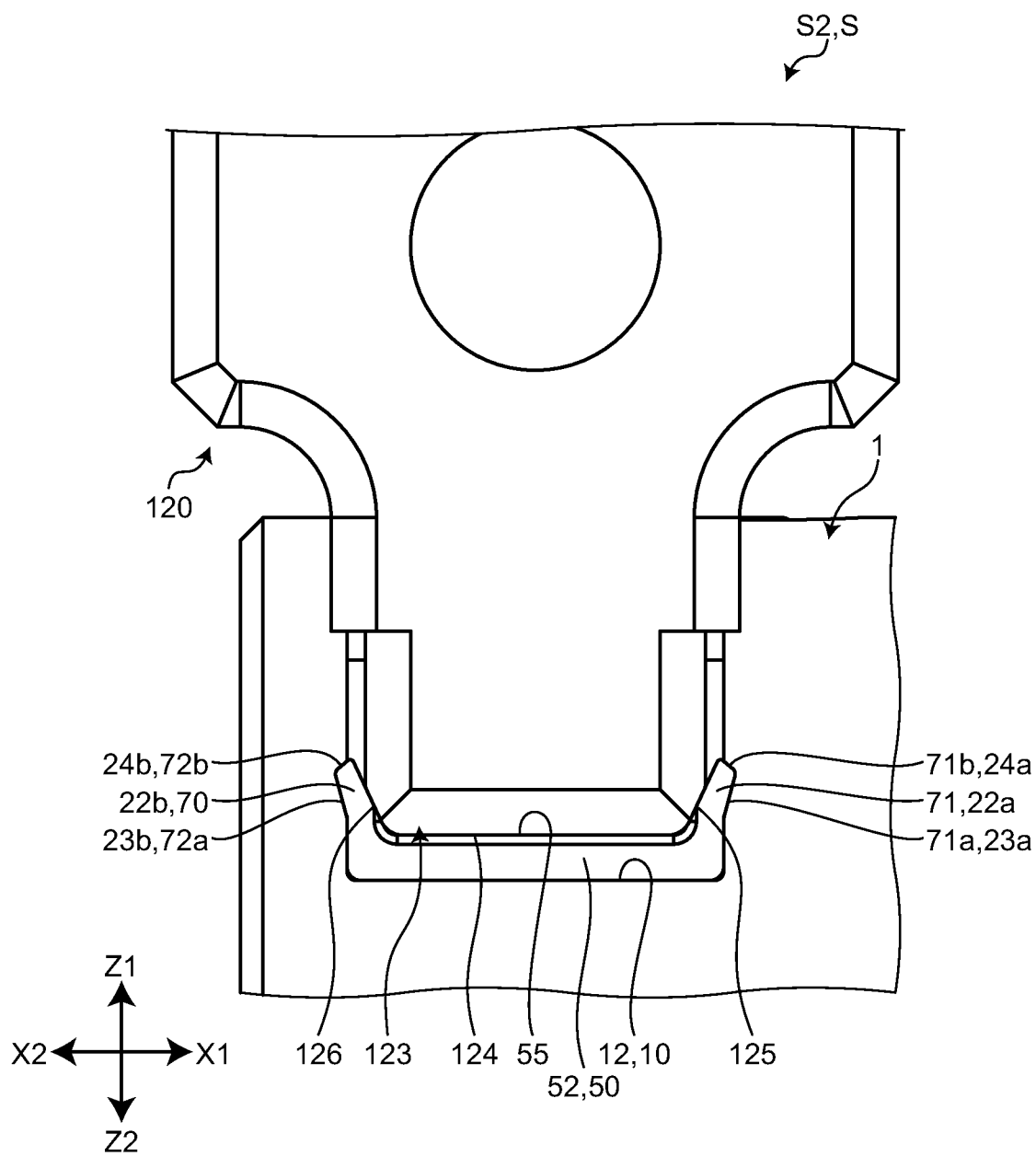
FIG. 15 is a side view of a state after caulking viewed from the second seat surface direction at the caulking step of the assembling method according to the first embodiment.

FIG. 15 is a side view of a state after caulking viewed from the second seat surface direction at the caulking step of the assembling method according to the first embodiment. As illustrated in FIG. 15, the jig 120 is pressed in the second vertical direction Z2, and the distal end surface 124 is caused to abut on the plane 55. Due to this, the first rib 61 is caulked in the first axial direction X1 by the first pressing surface 125. Additionally, the second rib 62 is caulked in the second axial direction X2 by the second pressing surface 126.

A caulked portion of the first rib 61 is inclined toward the first recessed part 22a arranged in the first axial direction X1, and becomes the first caulking part 71. The first caulking part 71 is compressed in the axial direction between an inner surface of the first recessed part 22a and the first pressing surface 125 to have a shape along the inner surface of the first recessed part 22a. That is, the first caulking part 71 includes the side surface 71a extending along the first oblique surface 23a and the end face 71b extending along the second oblique surface 24a.

Similarly, a caulked portion of the second rib 62 is inclined toward the second recessed part 22b arranged in the second axial direction X2, and becomes the second caulking part 72. The second caulking part 72 is compressed in the axial direction between an inner surface of the second recessed part 22b and the second pressing surface 126 to have a shape along the inner surface of the first recessed part 22a. That is, the second caulking part 72 includes the side surface 72a extending along the first oblique surface 23b and the end face 72b extending along the second oblique surface 24b.

When the first caulking part 71 and the second caulking part 72 are generated, the jig 120 is removed in the first vertical direction Z1, and the caulking step S2 ends.

Figure 16:
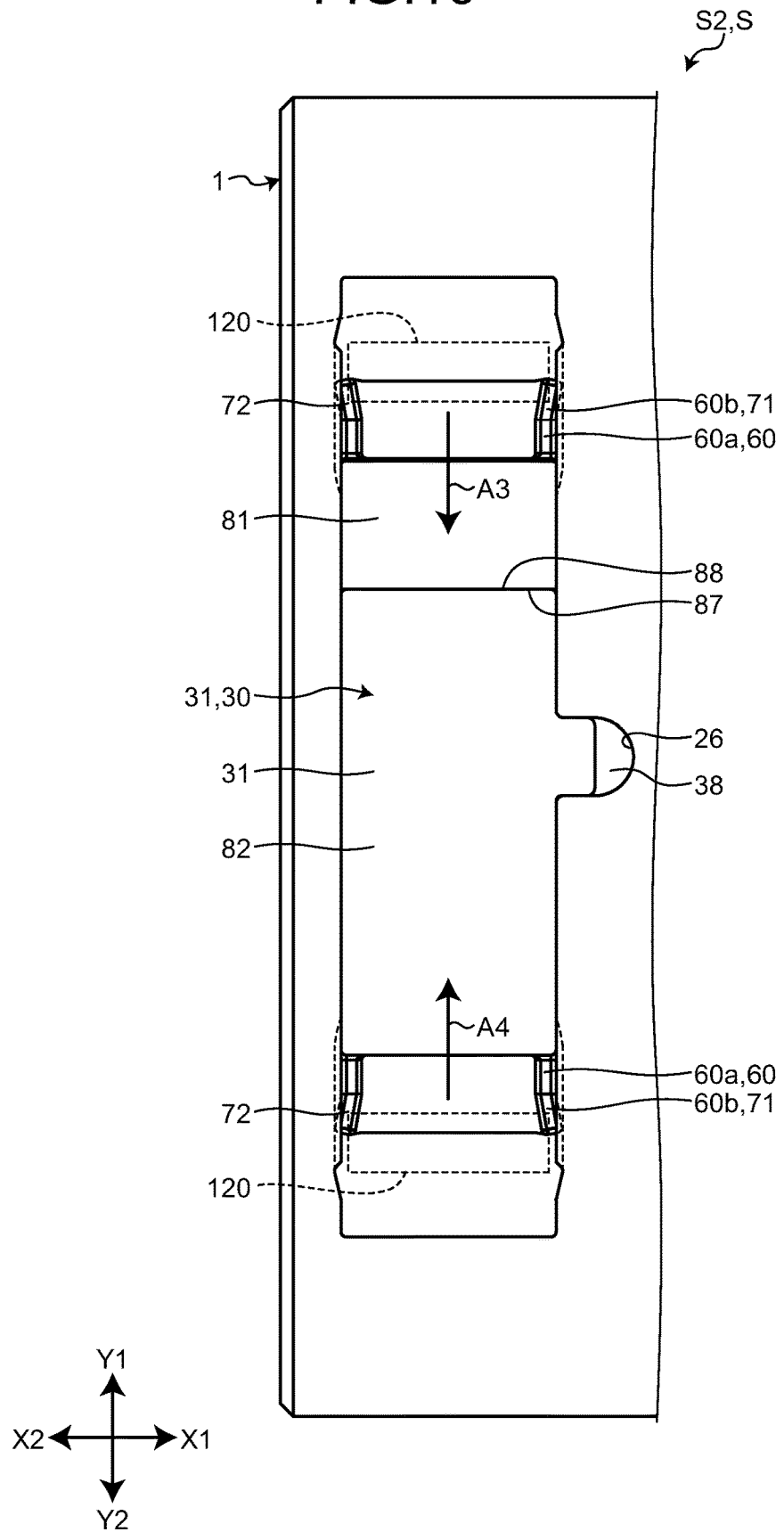
FIG. 16 is a plan view of the caulking step according to the first embodiment viewed from the first vertical direction.

FIG. 16 is a plan view of the caulking step according to the first embodiment viewed from the first vertical direction. As illustrated in FIG. 16, at the caulking step S2, a portion caulked by the jig 120 is not the entire rib 60 but the distal end part 60b of the rib 60. This is because the base part 60a of the rib 60 is connected to the deflector main body 31 and is hardly inclined. Furthermore, if the base part 60a of the rib 60 is forcibly caulked, the deflector main body 31 may be deformed.

When the distal end part 60b of the rib 60 is caulked, the first caulking part 71 and the second caulking part 72 form a substantially truncated chevron shape viewed from the first vertical direction Z1. That is, an inclination amount in the axial direction of the first caulking part 71 and the second caulking part 72 increases toward the distal end part 60b side. Not only the caulked distal end part 60b but also a center part in the seat surface direction of the rib 60 is slightly inclined in the axial direction.

On the other hand, during a caulking operation, a load acts on the middle deflector 30, the load toward a direction in which the rib 60 escapes from a load of the jig 120 (refer to arrows A3 and A4). In detail, in a case of caulking the rib 60 of the first arm part 51, a load in the second seat surface direction Y2 acts on the middle deflector 30 (refer to the arrow A3). On the other hand, in a case of caulking the rib 60 of the second arm part 52, a load in the first seat surface direction Y1 acts on the middle deflector 30 (refer to the arrow A4). Accordingly, there is a possibility that the positioning projection 38 is deformed and the middle deflector 30 is displaced.

Figure 17:
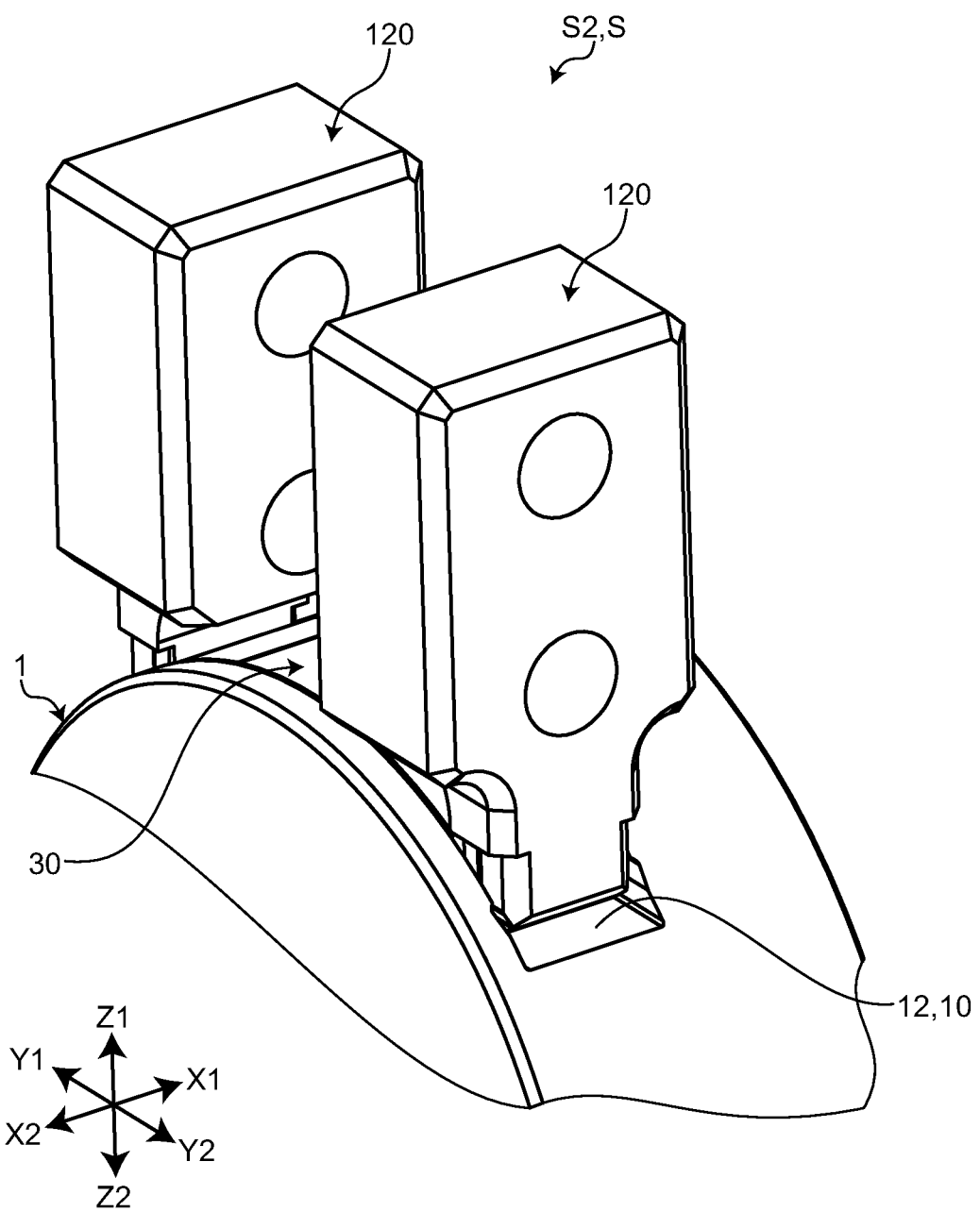
FIG. 17 is a perspective view of a state in which caulking is performed with two jigs at the caulking step according to the first embodiment that is obliquely viewed.

FIG. 17 is a perspective view of a state in which caulking is performed with two jigs at the caulking step according to the first embodiment that is obliquely viewed. Thus, at the caulking step S2, as illustrated in FIG. 17, it is preferable to prepare two jigs 120 to caulk the rib 60 of the first arm part 51 and the rib 60 of the second arm part 52 at the same time. Due to this, the load acting on the first arm part 51 (refer to the arrow A3 in FIG. 16) and the load acting on the second arm part 52 (refer to the arrow A4 in FIG. 16) are opposed to each other to be canceled each other. Accordingly, deformation of the positioning projection 38 can be avoided.

Regarding the inner peripheral side component 81 including the first arm part 51 and the outer peripheral side component 82 including the second arm part 52, the stepped surface 87 abuts on the end face 88 (refer to FIG. 7). Thus, if the first arm part 51 and the second arm part 52 are caulked with the two jigs 120 at the same time, joining between the inner peripheral side component 81 and the outer peripheral side component 82 is not released.

Next, the following describes a working effect of the ball screw device 100 according to the first embodiment. In the first embodiment, in a case in which a load acts on the middle deflector 30 in the first vertical direction Z1, the caulking part 70 is hooked by the recessed part 22. Thus, the middle deflector 30 is not displaced in the first vertical direction Z1. That is, the middle deflector 30 is not detached from the nut main body 1. Additionally, in the present embodiment, the base part 60a of the rib 60 is connected to the deflector main body 31, and the rib 60 and the caulking part 70 have high rigidity and are hardly inclined. Thus, even when a load acts on the middle deflector 30 in the first vertical direction Z1 and the caulking part 70 is hooked by the second oblique surface 24, the caulking part 70 is hardly deformed (additionally, hardly inclined). Also due to this, the middle deflector 30 is prevented from being displaced in the first vertical direction Z1.

The caulking part 70 is disposed on each of the first arm part 51 and the second arm part 52. That is, according to the first embodiment, the number of caulking points (caulking parts 70) is larger than that in a case in which the caulking part 70 is disposed on only one of the two arm parts 50. Thus, the middle deflector 30 is firmly prevented from slipping off. One of the two arm parts 50 is disposed on the inner peripheral side component 81, and the other one thereof is disposed on the outer peripheral side component 82. Due to this, if joining between the inner peripheral side component 81 and the outer peripheral side component 82 is released, each of the inner peripheral side component 81 and the outer peripheral side component 82 is not detached from the nut main body 1.

The caulking part 70 includes the first caulking part 71 and the second caulking part 72 for one arm part 50. That is, the number of caulking points (caulking parts 70) is larger than that in a case in which one caulking part 70 is disposed for one arm part 50. Thus, the middle deflector 30 is more firmly prevented from slipping off.

In a case in which a point abutting on the seat surface 10 is only one side of the middle deflector 30 in the axial direction in the seat surface direction with respect to the through hole 17, there is a possibility that the deflector main body 31 falls down to the through hole 17 and the middle deflector 30 is inclined. As a result, the tongue 35 is displaced, and the ball 103 is not smoothly scooped up. On the other hand, the middle deflector 30 according to the present embodiment includes, as seated surfaces 40, the first seated surface 41 and the first seated surface 53 for the arm part arranged in the first seat surface direction Y with respect to the through hole 17, and the second seated surface 42 and the second seated surface 54 for the arm part arranged in the second seat surface direction Y2 with respect to the through hole 17. That is, the middle deflector 30 includes the seated surfaces 40 on both sides in the seat surface direction across the through hole 17. Accordingly, the deflector main body 31 does not fall down to the through hole 17, and the attitude of the middle deflector 30 is stable. As a result, the ball 103 is smoothly scooped up.

The middle deflector 30 also includes the expanded seated surface 43 abutting on the expanded seat surface 13 of the seat surface 10. Accordingly, the attitude of the middle deflector 30 is further stabilized. The expanded seated surface 43 is disposed on the inner peripheral side component 81. Thus, if joining between the inner peripheral side component 81 and the outer peripheral side component 82 is released, the expanded seated surface 43 is hooked by the expanded seat surface 13, and the inner peripheral side component 81 is prevented from falling down to the through hole 17.

The division surface 80 between the inner peripheral side component 81 and the outer peripheral side component 82 extends in the axial direction along the ball passage 34. If the division surface extends in a direction orthogonal to the axial direction (a plane extending in both of the seat surface direction and the vertical direction), the tongue is divided in the axial direction, and the strength of the tongue is lowered. That is, in the present embodiment, by cutting the ball passage 34 in the axial direction, the tongue 35 is caused to be part of the configuration of the inner peripheral side component 81 without being divided. Due to this, the strength of the tongue 35 is maintained.

As described above, the ball screw device 100 according to the first embodiment includes the nut 101, the screw shaft 102 passing through the nut 101, and the balls 103 arranged between the nut 101 and the screw shaft 102. The nut 101 includes the nut main body 1 having a cylindrical shape through which the screw shaft 102 passes, and the circulation component (middle deflector 30) assembled to the nut main body 1. The nut main body 1 includes the housing part (first housing part 5), which is an indentation disposed on the outer peripheral surface 4 of the nut main body 1 and has a bow shape when viewed from the axial direction parallel with the screw shaft 102, the seat surface 10 forming the bottom surface of the housing part, the through hole 17 passing through the seat surface 10 and the inner peripheral surface 2 of the nut main body 1, and the pair of side surfaces 20 opposed to each other that are arranged on both sides in the axial direction parallel with the screw shaft 102 with respect to the housing part (first housing part 5). A direction parallel with the seat surface when viewed from the axial direction is the seat surface direction. A direction parallel with the perpendicular (virtual line K2) with respect to the seat surface, the direction that the seat surface 10 faces, is the first vertical direction Z1. The circulation component (middle deflector 30) includes the circulation component main body (deflector main body 31) arranged in the housing part and the through hole 17, the two arm parts 50 extending toward both sides in the seat surface direction from the circulation component main body and abutting on the seat surface, the rib 60 projecting from each of the two arm parts 50 in the first vertical direction Z1 and extending in the seat surface direction along the side surface 20, and the caulking part 70 obtained by caulking at least part of the rib 60 toward the side surface. The recessed parts 22 that the caulking parts 70 enter are disposed on the pair of side surfaces 20, the recessed parts 22 as grooves extending in the seat surface direction and being opposed to the ribs 60 in the axial direction. The ball passage 34 extending in the tangential direction (virtual line K1) with respect to the raceway 106 for the ball 103 is disposed in the circulation component main body (deflector main body 31). The circulation component (middle deflector 30) is obtained by joining the inner peripheral side component 81 to an outer peripheral side component 82E that are divided at the division surface 80 extending along the ball passage 34 when viewed from the axial direction. The inner peripheral side component 81 includes the tongue 35 for scooping up the ball 103 from the raceway 106, the inner peripheral side rolling surface 85 surrounding the inner peripheral side of the ball passage 34, and one of the two arm parts 50. The outer peripheral side component 82 includes the outer peripheral side rolling surface 86 surrounding the outer peripheral side of the ball passage 34, and the other one of the two arm parts 50.

According to the first embodiment, the circulation component (middle deflector 30) is not detached from the nut main body 1. Additionally, a pin for fixing the circulation component (middle deflector 30) is not required, so that the number of components is prevented from being increased. If joining between the inner peripheral side component 81 and the outer peripheral side component 82 is released, each of the inner peripheral side component 81 and the outer peripheral side component 82 has the one arm part 50. Accordingly, each of the inner peripheral side component 81 and the outer peripheral side component 82 does not fall down to the through hole 17, and is not detached from the nut main body 1. The tongue 35 is disposed integrally with the inner peripheral side component 81 without being divided. Accordingly, the strength of the tongue 35 is maintained, and the ball 103 is smoothly scooped up.

In the first embodiment, the pair of side surfaces 20 include the first side surface 20a arranged on one side of the axial direction with respect to the circulation component (middle deflector 30), and the second side surface 20b arranged on the other side of the axial direction with respect to the circulation component. The ribs 60 include the first rib 61 extending along the first side surface 20a, and the second rib 62 extending along the second side surface 20b. The caulking parts 70 include the first caulking part 71, which is part of the first rib 61 and caulked to the first side surface 20a, and the second caulking part 72, which is part of the second rib 62 and caulked to the second side surface 20b.

According to the first embodiment, the number of the caulking points (caulking parts 70) is large, so that the middle deflector 30 is more firmly prevented from slipping off.

The nut main body 1 according to the first embodiment includes the positioning hole 26, which is recessed in the axial direction from the side surface 20 and opens to the outer peripheral surface 4 of the nut main body 1. The circulation component main body (deflector main body 31) includes the positioning projection 38 projecting in the axial direction to be inserted into the positioning hole 26.

According to the first embodiment, displacement of the middle deflector 30 in the seat surface direction is regulated. Thus, the tongue 35 is arranged at a predetermined position, and the ball 103 is smoothly scooped up.

The seat surface 10 according to the first embodiment includes the expanded seat surface 13, which is the edge 17a of the through hole 17, and arranged on both sides in the axial direction with respect to the through hole 17. The inner peripheral side component 81 includes the expanded seated surface 43 abutting on the expanded seat surface 13.

According to the first embodiment, the number of portions abutting on the seat surface 10 increases, and the attitude of the middle deflector 30 is further stabilized. Additionally, the inner peripheral side component 81 can be prevented from falling down to the through hole 17.

The ball screw device 100 according to the first embodiment has been described above. Next, the following describes other embodiments in which the nut in the first embodiment is partially deformed. In the nut 101 according to the first embodiment, in view of a tolerance, a minute gap (not illustrated) is generated between the first side surface 20a and the first opposing surface 36, or between the second side surface 20b and the second opposing surface 46, or between both of them. If the gap between the first side surface 20a and the first opposing surface 36 is large, the opening 37 of the ball passage 34 is separated from the opening 8a of the return path 8, and the ball 103 cannot be smoothly delivered. The following describes a second embodiment to a fourth embodiment in which the above point is improved. The following focuses on changes from the first embodiment.

Second Embodiment

Figure 18:
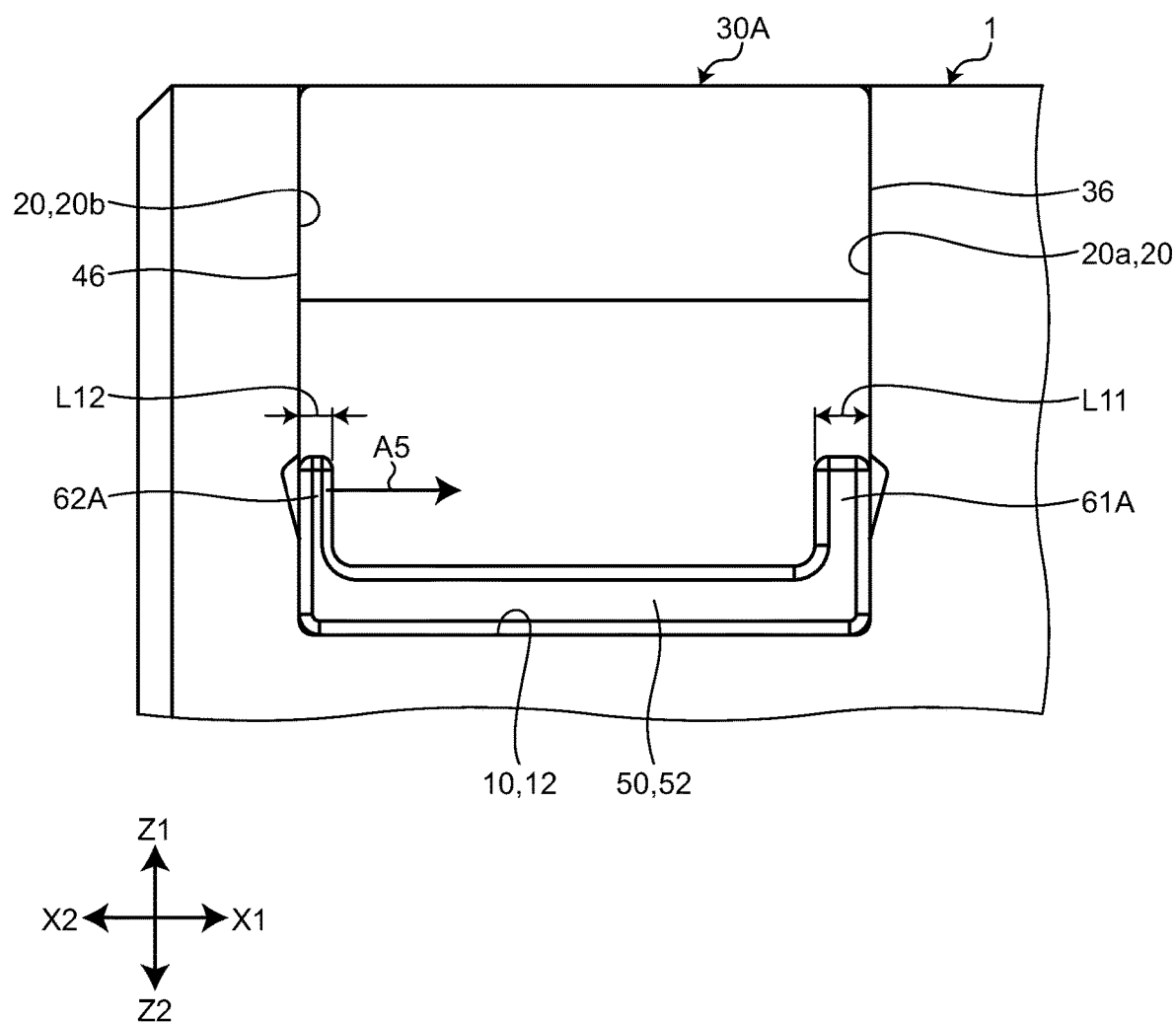
FIG. 18 is a side view of a nut according to a second embodiment in a state before a rib is caulked thereto viewed from the second seat surface direction.
Figure 19:
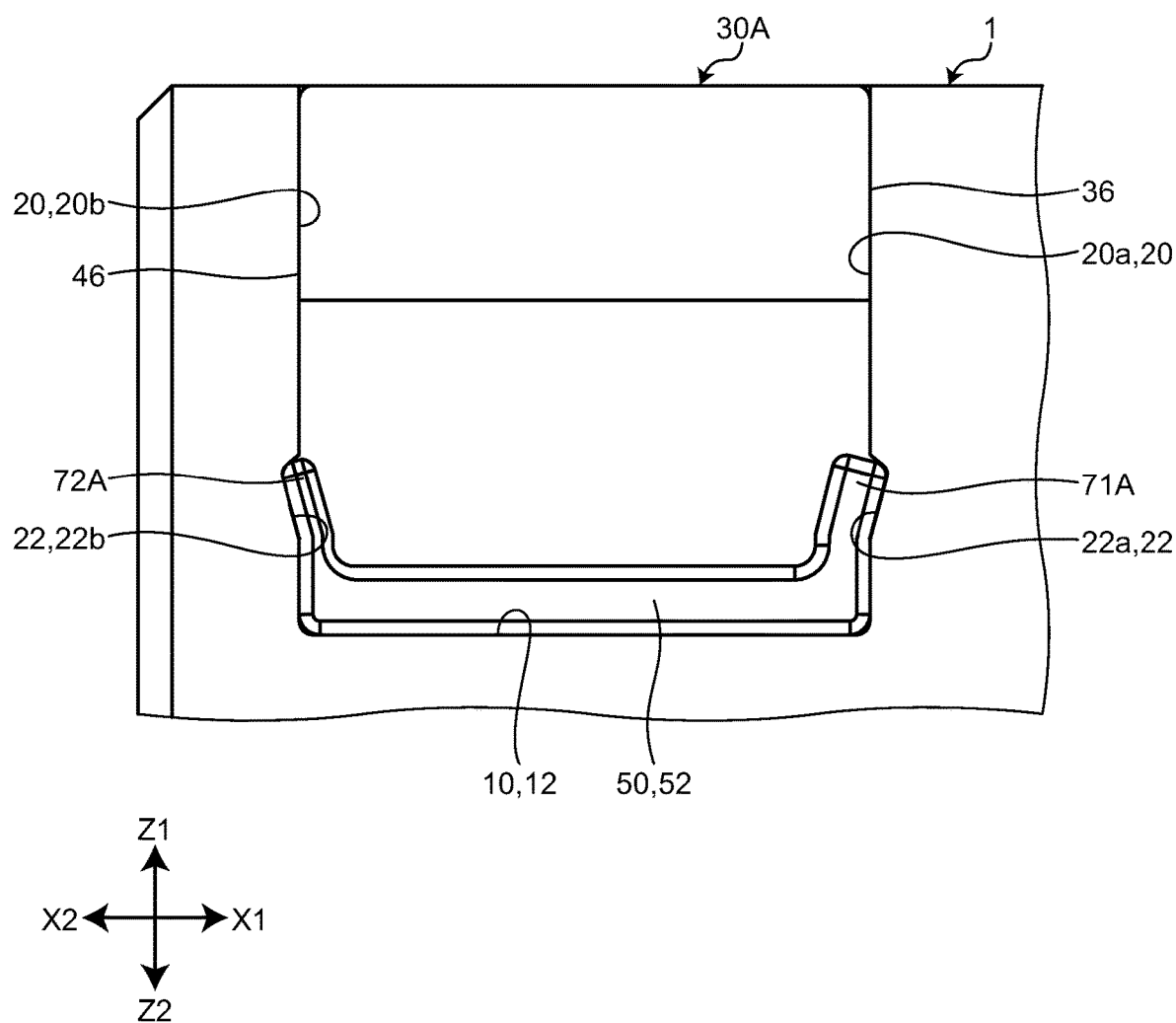
FIG. 19 is a side view of the nut according to the second embodiment in a state after the rib is caulked thereto viewed from the second seat surface direction.

FIG. 18 is a side view of the nut according to the second embodiment in a state before the rib is caulked thereto viewed from the second seat surface direction. FIG. 19 is a side view of the nut according to the second embodiment in a state after the rib is caulked thereto viewed from the second seat surface direction. As illustrated in FIG. 18, a middle deflector 30A according to the second embodiment is different from the middle deflector 30 according to the first embodiment in that the middle deflector 30A includes a first rib 61A and a second rib 62A having different thicknesses in the axial direction. FIG. 18 illustrates only the rib of the second arm part, but the first rib 61A and the second rib 62A are also disposed on the first arm part 51.

A thickness L12 in the axial direction of the second rib 62A is smaller than a thickness L11 in the axial direction of the first rib 61A. When the first rib 61A is caulked with the jig 120 (refer to FIG. 14, for example), a first caulking part 71A is generated as illustrated in FIG. 19. When the second rib 62A is caulked with the jig 120 (refer to FIG. 14, for example), a second caulking part 72A is generated.

When the first rib 61A and the second rib 62A are caulked with the jig 120 at the same time, the second rib 62A having a smaller thickness in the axial direction and having lower rigidity starts to be inclined (starts to be deformed) earlier than the first rib 61A. A caulked portion (the second caulking part 72A) of the second rib 62A abuts on an inner surface of the recessed part 22 earlier than a caulked portion (the first caulking part 71A) of the first rib 61A, and presses the inner surface of the recessed part 22. Due to this, reaction force (refer to an arrow A5) against pressing force of the second caulking part 72A acts on the middle deflector 30A. The middle deflector 30A then moves in the first axial direction X1, and the first opposing surface 36 abuts on the first side surface 20a.

As described above, according to the second embodiment, the opening 37 of the ball passage 34 continues (is adjacent) to the opening 8a of the return path 8, and the ball 103 can be smoothly delivered.

Third Embodiment

Figure 20:
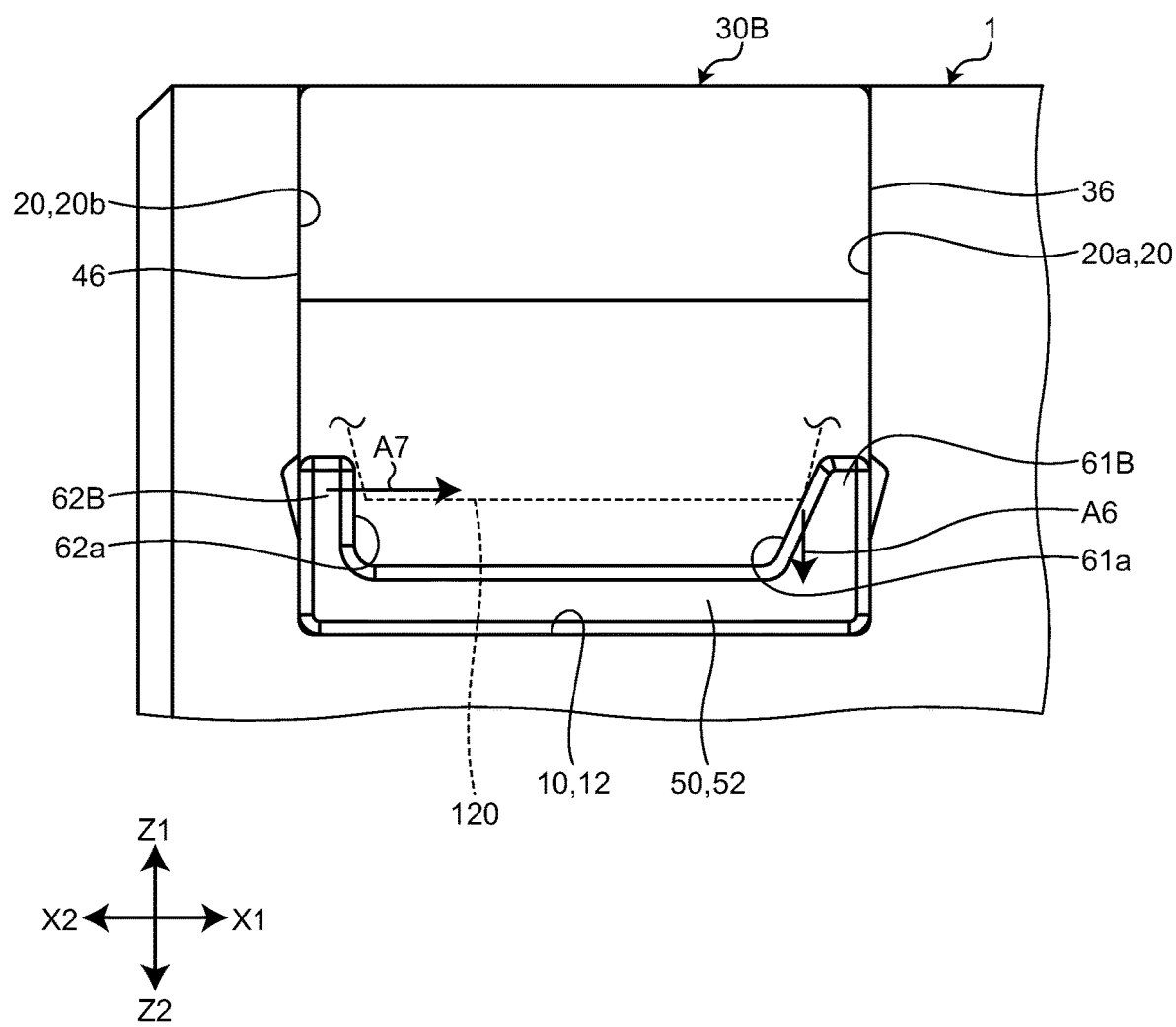
FIG. 20 is a side view of a nut according to a third embodiment in a state before a rib is caulked thereto viewed from the second seat surface direction.
Figure 21:
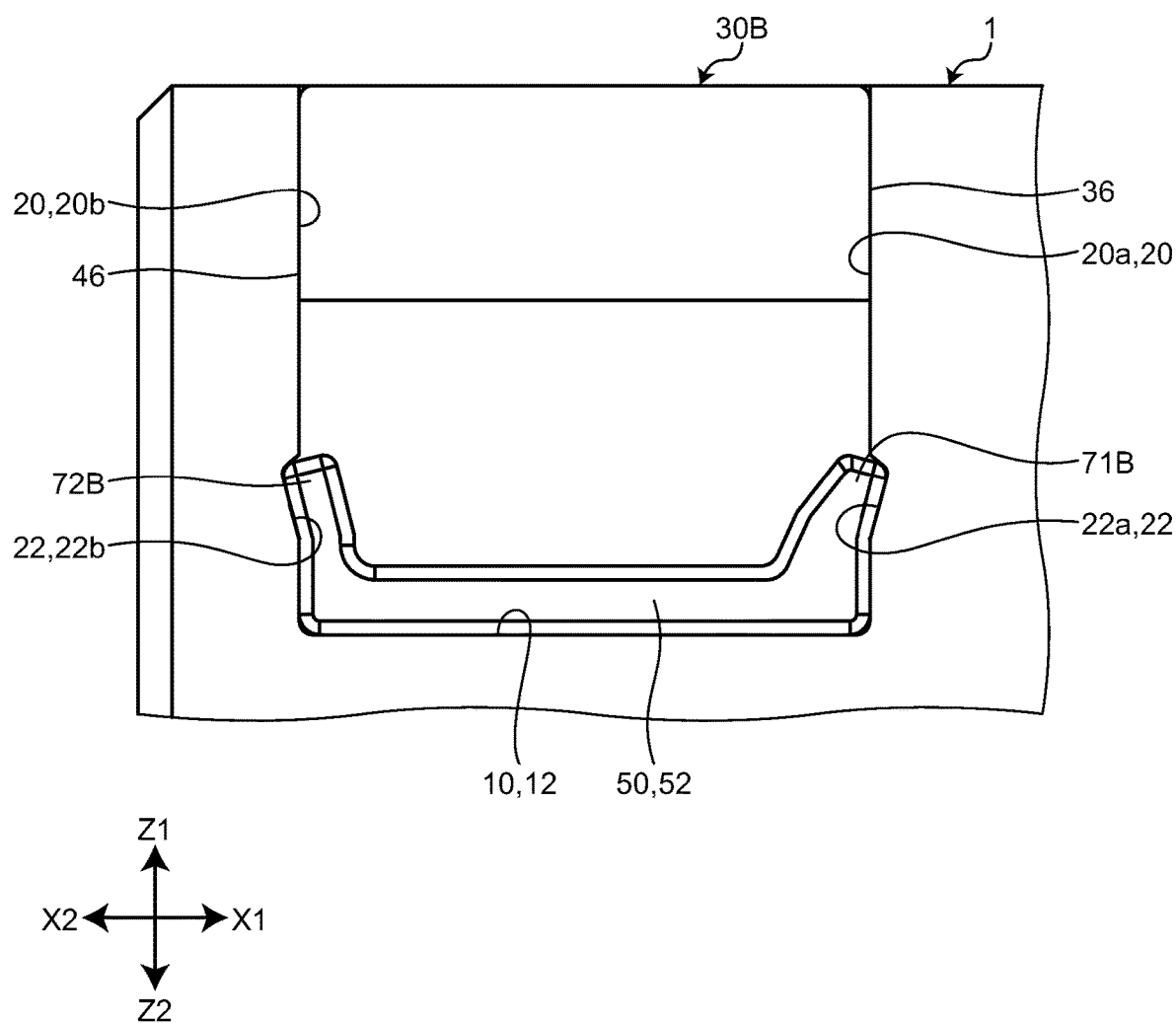
FIG. 21 is a side view of the nut according to the third embodiment in a state after the rib is caulked thereto viewed from the second seat surface direction.

FIG. 20 is a side view of the nut according to the third embodiment in a state before the rib is caulked thereto viewed from the second seat surface direction. FIG. 21 is a side view of the nut according to the third embodiment in a state after the rib is caulked thereto viewed from the second seat surface direction. As illustrated in FIG. 20, a middle deflector 30B according to the third embodiment is different from the middle deflector 30 according to the first embodiment in that the middle deflector 30B includes a first rib 61B and a second rib 62B in place of the first rib 61 and the second rib 62.

The first rib 61B includes a first caulking surface 61a facing the second axial direction X2. The second rib 62B includes a second caulking surface 62a facing the first axial direction X1. The first caulking surface 61a and the second caulking surface 62a are opposed to each other. The first caulking surface 61a is an inclined surface that is inclined to be closer to the first side surface 20a (in the first axial direction X1) toward the first vertical direction Z1.

When the first caulking surface 61a is caulked with the jig 120, part of a caulking load (a load in the first axial direction X1) acting on the first caulking surface 61a is converted into a load in the second vertical direction Z2. That is, the load in the first axial direction X1 acting on the first rib 61B is reduced. A base part side of the first rib 61B (a portion close to the arm part 50) has a large thickness in the axial direction, and has high rigidity. Due to this, the first rib B is hardly deformed as compared with the second rib 62B. Thus, in a case of caulking the first rib 61B and the second rib 62B with the jig 120 at the same time, the first rib 61B is inclined later than the second rib 62B. Accordingly, a caulked portion (a second caulking part 72B) of the second rib 62B abuts on the inner surface of the recessed part 22 earlier than the first rib 61B, and further presses the inner surface of the recessed part 22. As a result, the second caulking part 72B receives reaction force (refer to an arrow A7) from the inner surface of the recessed part 22, the middle deflector 30B moves in the first axial direction X1, and the first opposing surface 36 abuts on the first side surface 20a.

As described above, according to the third embodiment, the opening 37 of the ball passage 34 continues (is adjacent) to the opening 8a of the return path 8, and the ball 103 can be smoothly delivered.

Fourth Embodiment

Figure 22:
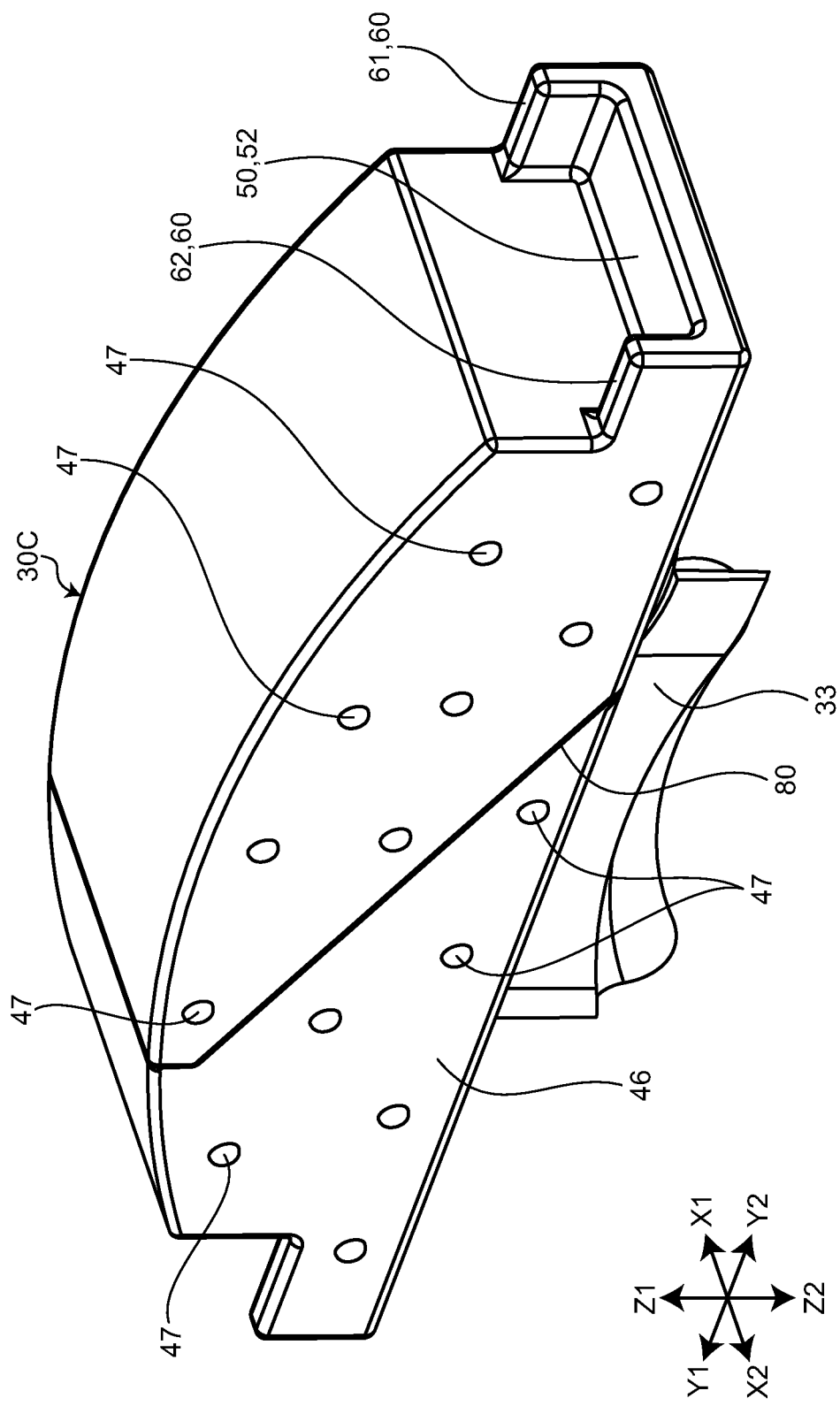
FIG. 22 is a perspective view of a middle deflector according to a fourth embodiment viewed from a second axial direction.
Figure 23:
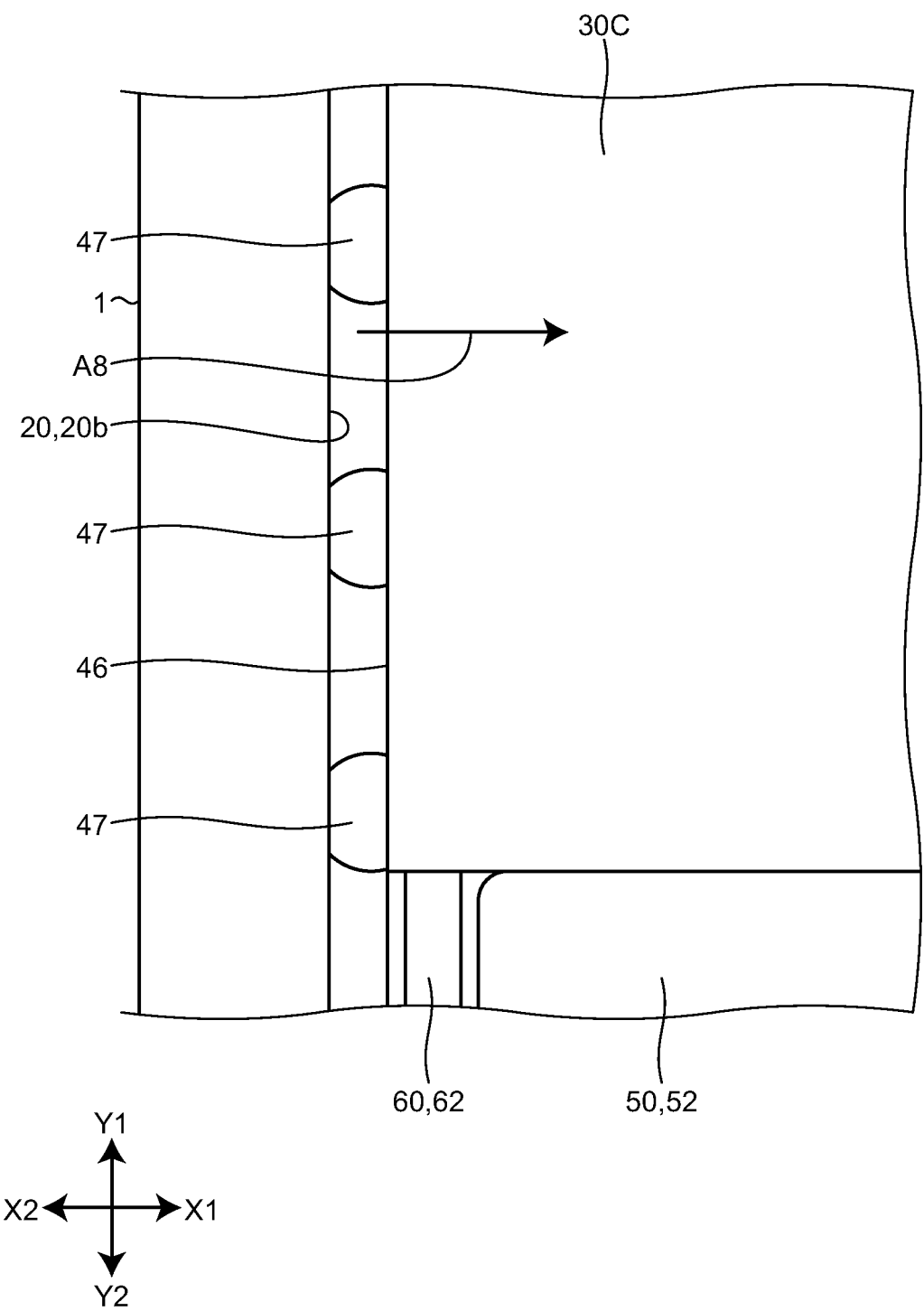
FIG. 23 is an enlarged view of a gap between a second side surface and a second opposing surface of a nut according to the fourth embodiment viewed from the first vertical direction.

FIG. 22 is a perspective view of the middle deflector according to the fourth embodiment viewed from the second axial direction. FIG. 23 is an enlarged view of the gap between the second side surface and the second opposing surface of the nut according to the fourth embodiment viewed from the first vertical direction. As illustrated in FIG. 22, a middle deflector 30C according to the fourth embodiment is different from the middle deflector 30 according to the first embodiment in that a plurality of projecting parts 47 are disposed on the second opposing surface 46.

The projecting part 47 is a projection that is formed integrally with the middle deflector 30C. The projecting part 47 has a hemispherical shape. Thus, a cross section of the projecting part 47 cut along a plane extending in the seat surface direction and the vertical direction has a circular shape. A projecting amount in the axial direction of the projecting part 47 is larger than a minute gap (tolerance) in the axial direction generated between the first housing part 5 and the middle deflector 30C.

As illustrated in FIG. 23, when the middle deflector 30C according to the fourth embodiment is inserted into the first housing part 5, the projecting part 47 is pressed against the second side surface 20b, and a distal end part of the projecting part 47 is crushed. Due to this, the middle deflector 30C is pressed in the first axial direction X1 (refer to an arrow A8 in FIG. 23), and the first opposing surface 36 abuts on the first side surface 20a. As described above, also according to the fourth embodiment, the opening 37 of the ball passage 34 continues (is adjacent) to the opening 8a of the return path 8, and the ball 103 can be smoothly delivered. A plurality of the projecting parts 47 are provided in the present embodiment, but it is sufficient that at least one projecting part 47 is provided according to the present disclosure. The shape of the projecting part 47 is not limited to the hemispherical shape, but may be a cylinder, a rectangular column, a cone, and a frustum. The shape is not particularly limited.

The second embodiment to the fourth embodiment have been described above, but pieces of technical content of the second embodiment to the fourth embodiment may be combined with each other in the present disclosure. That is, all of the second embodiment to the fourth embodiment may be applied to the present disclosure. Alternatively, two of the second embodiment to the fourth embodiment may be selected to be applied.

Fifth Embodiment

Figure 24:
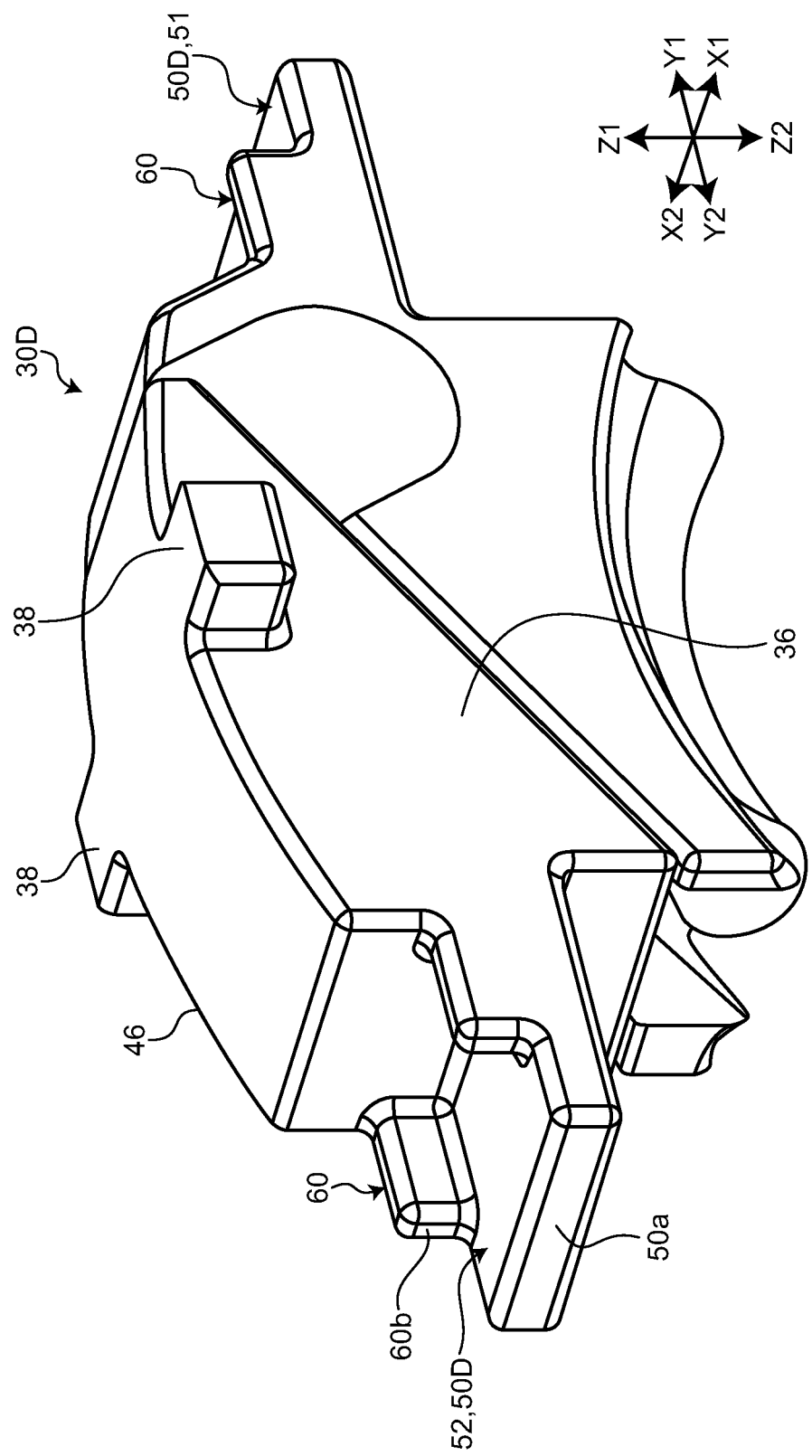
FIG. 24 is a perspective view of a middle deflector according to a fifth embodiment that is obliquely viewed.

FIG. 24 is a perspective view of the middle deflector according to the fifth embodiment that is obliquely viewed. A middle deflector 30D according to the fifth embodiment is different from the middle deflector 30 according to the first embodiment in that a length in the seat surface direction of an arm part 50D is longer than a length in the seat surface direction of the rib 60. That is, a distal end part 50a of the arm part 50D according to the fifth embodiment projects toward an outer side in the seat surface direction than the distal end part 60b of the rib 60. With the middle deflector 30D, an area abutting on the seat surface 10 is increased, and an attitude of the middle deflector 30D is further stabilized.

The middle deflector 30D according to the fifth embodiment is different from the middle deflector 30 according to the first embodiment in that positioning projections 38 are disposed on both of the first opposing surface 36 and the second opposing surface 46 (not illustrated in FIG. 24, refer to FIG. 11 and FIG. 12). Although not particularly illustrated in the drawings, positioning holes 26 are each disposed on the first side surface 20a and the second side surface 20b of the nut main body 1. Due to this, positioning in the seat surface direction by the middle deflector 30D can be strengthened. Additionally, the present disclosure does not necessarily include the expanded seated surface 43 (refer to FIG. 9) like the middle deflector 30D according to the fifth embodiment.

According to the fifth embodiment, the positioning projections 38 are disposed on both of the first opposing surface 36 and the second opposing surface 46, so that there is a possibility that the middle deflector 30 may be arranged in the first housing part 5 in an erroneous orientation. Thus, in the middle deflector 30D according to the fifth embodiment, a sign indicating an assembling direction of the deflector main body (circulation component main body) 31 with respect to the first housing part (housing part) 5 is preferably attached to an outer peripheral surface of the deflector main body (circulation component main body) 31.

Sixth Embodiment

Figure 25:
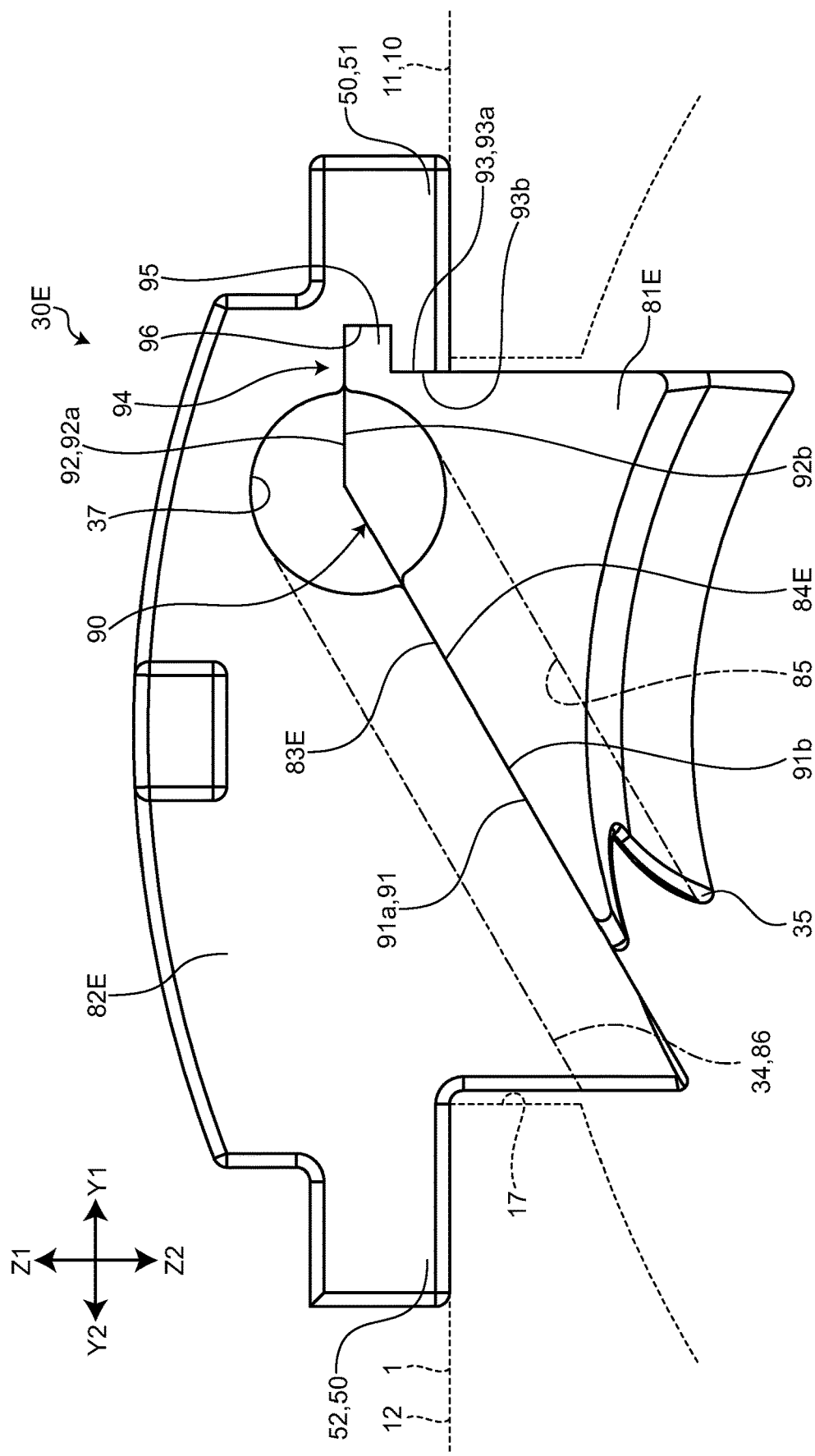
FIG. 25 is a side view of a middle deflector according to a sixth embodiment viewed from a first axial direction.
Figure 26:
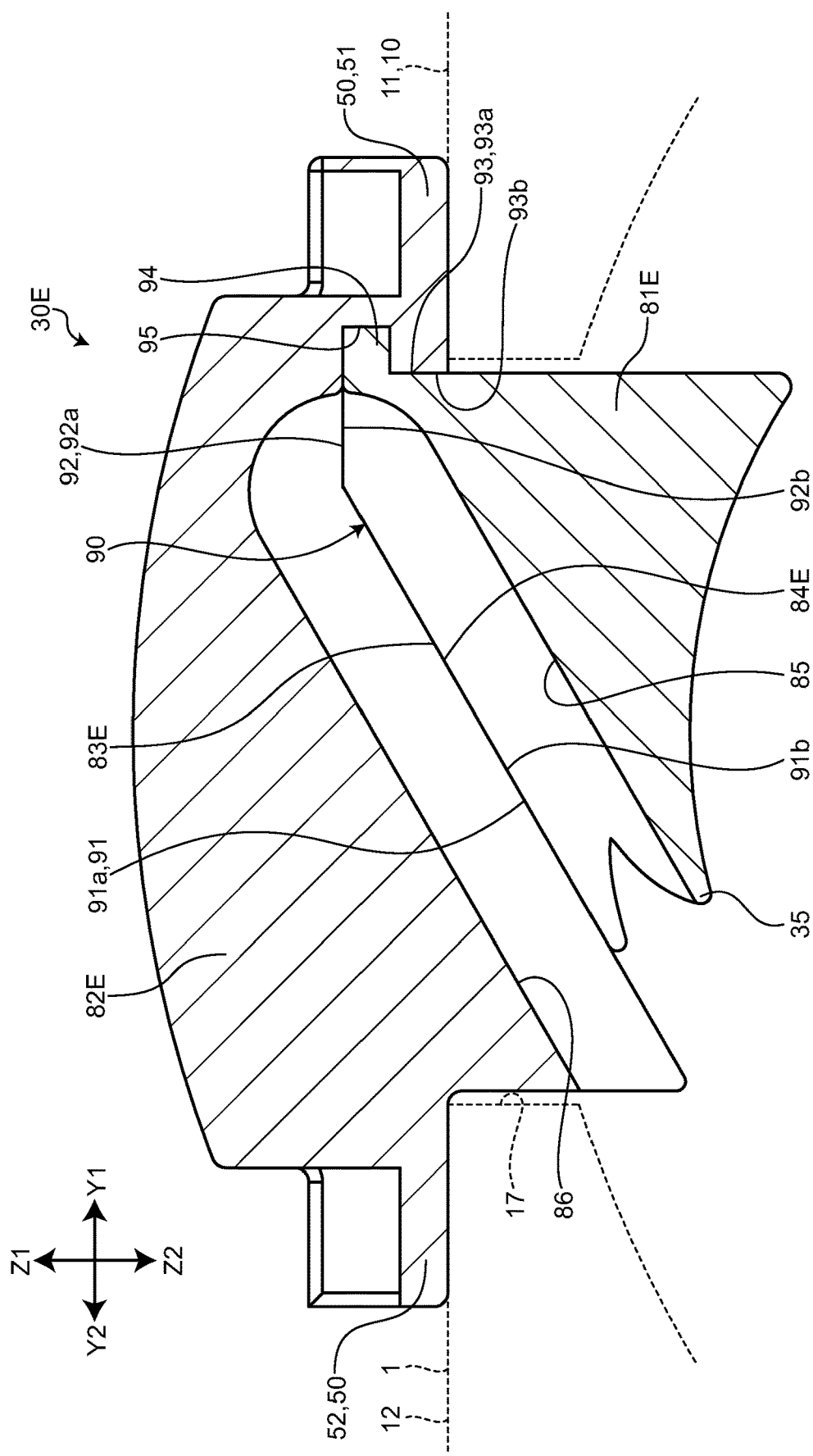
FIG. 26 is a cross-sectional view of the middle deflector according to the sixth embodiment cut along a plane extending in a seat surface direction and a vertical direction.

FIG. 25 is a side view of the middle deflector according to the sixth embodiment viewed from the first axial direction. FIG. 26 is a cross-sectional view of the middle deflector according to the sixth embodiment cut along a plane extending in the seat surface direction and the vertical direction. As illustrated in FIG. 25, a middle deflector 30E according to the sixth embodiment is different from the middle deflector 30 according to the first embodiment in that the middle deflector 30E includes an inner peripheral side component 81E and an outer peripheral side component 82E in place of the inner peripheral side component 81 and the outer peripheral side component 82.

A division surface 90 between the inner peripheral side component 81E and the outer peripheral side component 82E includes, when viewed from the axial direction, an oblique surface 91 extending along the ball passage 34, a lateral surface 92 extending in the first seat surface direction Y1 from an end part on a radially outer side of both end parts of the oblique surface 91, and a vertical surface 93 extending in the second vertical direction Z2 from the first seat surface direction Y1 of the lateral surface 92. An engagement part 94 is disposed on the vertical surface 93.

Hereinafter, of an inner peripheral side division surface 83E of the inner peripheral side component 81E, a portion positioned on the oblique surface 91 is referred to as an inner peripheral side oblique surface 91a, a portion positioned on the lateral surface 92 is referred to as an inner peripheral side lateral surface 92a, and a portion positioned on the vertical surface 93 is referred to as an inner peripheral side vertical surface 93a. Of an outer peripheral side division surface 84E of the outer peripheral side component 82E, a portion positioned on the oblique surface 91 is referred to as an outer peripheral side oblique surface 91b, a portion positioned on the lateral surface 92 is referred to as an outer peripheral side lateral surface 92b, and a portion positioned on the vertical surface 93 is referred to as an outer peripheral side vertical surface 93b.

The oblique surface 91 is inclined to be positioned in the first seat surface direction Y1 toward the first vertical direction Z1. The oblique surface 91 overlaps with a center part of the ball passage 34 when viewed from the axial direction. Thus, as illustrated in FIG. 26, the inner peripheral side rolling surface 85 having a C-shape opening in the first vertical direction Z1 is disposed on the inner peripheral side oblique surface 91a of the inner peripheral side component 81E. The outer peripheral side rolling surface 86 having a C-shape opening in the second vertical direction Z2 is disposed on the outer peripheral side oblique surface 91b of the outer peripheral side component 82E. Thus, groove surfaces (the inner peripheral side rolling surface 85 and the outer peripheral side rolling surface 86) are disposed on the inner peripheral side division surface 83E and the outer peripheral side division surface 84E, respectively. Thus, the ball 103 rolls in the ball passage 34 smoothly as compared with the first embodiment.

The lateral surface 92 is parallel with the seat surface 10. The vertical surface 93 is parallel with the vertical direction. The engagement part 94 includes a projection 95 and a groove part 96. The projection 95 projects from the inner peripheral side vertical surface 93a in the first seat surface direction Y1. The groove part 96 is recessed from the outer peripheral side vertical surface 93b in the first seat surface direction Y1. Each of the projection 95 and the groove part 96 extends in the axial direction. The projection 95 is inserted, from the axial direction, into the groove part 96 to be engaged therewith.

The inner peripheral side component 81E according to the sixth embodiment includes the tongue 35 and the inner peripheral side rolling surface 85. The outer peripheral side component 82E includes the outer peripheral side rolling surface 86 and the two arm parts 50.

As described above, the middle deflector (circulation component) 30E of the middle deflector 30E according to the sixth embodiment is obtained by joining the inner peripheral side component 81E to the outer peripheral side component 82E that are divided at the division surface 90 extending along the ball passage 34 when viewed from the axial direction. The inner peripheral side component 81E includes the tongue 35 for scooping up the ball 103 from the raceway 106, the inner peripheral side rolling surface 85 surrounding the inner peripheral side of the ball passage 34, and the inner peripheral side division surface 83E extending along the division surface. The outer peripheral side component 82E includes the outer peripheral side rolling surface 86 surrounding the outer peripheral side of the ball passage 34, the two arm parts 50, and the outer peripheral side division surface 84E extending along the division surface 90. On one of the inner peripheral side division surface 83E and the outer peripheral side division surface 84E of the outer peripheral side component 82E, disposed is the projection 95 projecting in the seat surface direction and extending in the axial direction. On the other one of the inner peripheral side division surface 83E and the outer peripheral side division surface 84E of the outer peripheral side component 82E, disposed is the groove part 96 that is recessed in the seat surface direction and extends in the axial direction, the groove part 96 with which the projection 95 is engaged.

As described above, the middle deflector 30E according to the sixth embodiment includes the caulking part (not illustrated in FIG. 25 and FIG. 26) similarly to the first embodiment, and is not displaced in the first vertical direction Z1. If joining between the inner peripheral side component 81E and the outer peripheral side component 82E is released, the outer peripheral side component 82E includes the two arm parts 50, so that the outer peripheral side component 82E is not displaced in the vertical direction. On the other hand, the inner peripheral side component 81E does not include the arm part 50, but the projection 95 is hooked by the groove part 96, so that the inner peripheral side component 81E is not displaced in the second vertical direction Z2. That is, the inner peripheral side component 81E is prevented from falling down to the through hole 17. The tongue 35 is disposed integrally with the inner peripheral side component 81E without being divided. Accordingly, the strength of the tongue 35 is maintained, and the ball 103 is smoothly scooped up.

When joining between the inner peripheral side component 81E and the outer peripheral side component 82E is released, and the inner peripheral side component 81E slides in the axial direction, the inner peripheral side component 81E is brought into contact with the edge 17a (refer to FIG. 4) of the through hole 17. Thus, it is possible to avoid a situation in which the projection 95 slides in the axial direction, and engagement with the groove part 96 is released. The outer peripheral side oblique surface 91b is arranged in the second seat surface direction Y2 of the groove part 96. Thus, movement of the inner peripheral side component 81E in the second seat surface direction Y2 is regulated. Due to this, it is possible to avoid a situation in which the projection 95 moves in the second seat surface direction Y2, and engagement with the groove part 96 is released. As described above, movement of the inner peripheral side component 81E in a direction of releasing engagement is regulated. Due to this, the inner peripheral side component 81E is not separated from the outer peripheral side component 82E, so that the inner peripheral side component 81E does not fall down to the through hole 17.

The embodiments have been described above, but the present disclosure is not limited to the middle deflector 30 and the first housing part 5 (seat surface 10) extending in a direction orthogonal to the axis O (refer to FIG. 4) when viewed from the outer peripheral side. For example, the middle deflector 30 and the first housing part 5 (seat surface 10) may extend in a direction parallel with the raceway 106. That is, the middle deflector 30 and the first housing part 5 (seat surface 10) may be inclined in a direction other than the direction orthogonal to the axis O when viewed from the outer peripheral side, and the direction is not particularly limited. In a case in which the middle deflector 30 and the seat surface 10 are inclined to be arranged, the through hole 17 may be inclined in the same direction as the seat surface 10.

In the embodiment, the caulking parts 70 (the first caulking part 71 and the second caulking part 72) are disposed on both sides in the axial direction of the arm part 50, but the caulking part 70 may be disposed only on one side in the axial direction of the arm part 50 in the present disclosure. In the embodiment, the caulking parts 70 are disposed on both of the first arm part 51 and the second arm part 52, but the caulking part 70 may be disposed only on one of the first arm part 51 and the second arm part 52.

The outer peripheral surface 32a of the middle deflector 30 according to the embodiment has a circular arc shape, but the outer peripheral surface 32a of the middle deflector 30 does not necessarily have a circular arc shape in the present disclosure. In the present disclosure, a distance between the axis O and the outer peripheral surface 32a of the middle deflector 30 may be smaller than an outer diameter of the nut main body 1.

The expanded seat surface 13 according to the embodiment includes the first expanded seat surface 14 and the second expanded seat surface 15, but the expanded seat surface 13 may be constituted of the first expanded seat surface 14 or the second expanded seat surface 15 in the present disclosure.

REFERENCE SIGNS LIST

1 NUT MAIN BODY
5 FIRST HOUSING PART (HOUSING PART)
8 RETURN PATH

10 SEAT SURFACE
11 FIRST SEAT SURFACE
12 SECOND SEAT SURFACE
13 EXPANDED SEAT SURFACE
14 FIRST EXPANDED SEAT SURFACE
15 SECOND EXPANDED SEAT SURFACE
17 THROUGH HOLE
20 SIDE SURFACE
20a FIRST SIDE SURFACE
20b SECOND SIDE SURFACE
22 RECESSED PART
22a FIRST RECESSED PART
22b SECOND RECESSED PART
23, 23a, 23b FIRST OBLIQUE SURFACE
24, 24a, 24b SECOND OBLIQUE SURFACE
26 POSITIONING HOLE
30, 30A, 30B, 30C, 30D, 30E MIDDLE DEFLECTOR (CIRCULATION DEVICE)
31 DEFLECTOR MAIN BODY (CIRCULATION COMPONENT MAIN BODY)
32 MAIN BODY PART
33 SCOOP-UP PART
34 BALL PASSAGE
36 FIRST OPPOSING SURFACE
38 POSITIONING PROJECTION
40 SEATED SURFACE
41 FIRST SEATED SURFACE
42 SECOND SEATED SURFACE
43 EXPANDED SEATED SURFACE
44 FIRST EXPANDED SEATED SURFACE
45 SECOND EXPANDED SEATED SURFACE
46 SECOND OPPOSING SURFACE
47 PROJECTING PART
50, 50D ARM PART
51 FIRST ARM PART
52 SECOND ARM PART
53 FIRST SEATED SURFACE FOR ARM PART
54 SECOND SEATED SURFACE FOR ARM PART
60 RIB
61, 61A, 61B FIRST RIB
61a FIRST CAULKING SURFACE
62, 62A, 62B SECOND RIB
62a SECOND CAULKING SURFACE
70 CAULKING PART
71, 71A, 71B FIRST CAULKING PART
72, 72A, 72B SECOND CAULKING PART
80, 90 DIVISION SURFACE
81, 81E INNER PERIPHERAL SIDE COMPONENT
82, 82E OUTER PERIPHERAL SIDE COMPONENT
83, 83E INNER PERIPHERAL SIDE DIVISION SURFACE
84, 84E OUTER PERIPHERAL SIDE DIVISION SURFACE
85 INNER PERIPHERAL SIDE ROLLING SURFACE
86 OUTER PERIPHERAL SIDE ROLLING SURFACE
87 STEPPED SURFACE
88 END FACE
91 OBLIQUE SURFACE
91a INNER PERIPHERAL SIDE OBLIQUE SURFACE
91b OUTER PERIPHERAL SIDE OBLIQUE SURFACE
92 LATERAL SURFACE
92a INNER PERIPHERAL SIDE LATERAL SURFACE
92b OUTER PERIPHERAL SIDE LATERAL SURFACE
93 VERTICAL SURFACE
93a INNER PERIPHERAL SIDE VERTICAL SURFACE
93b OUTER PERIPHERAL SIDE VERTICAL SURFACE
94 ENGAGEMENT PART
95 PROJECTION
96 GROOVE PART
100 BALL SCREW DEVICE
101 NUT
102 SCREW SHAFT
103 BALL
120 JIG

The invention claimed is:

1. A nut comprising:
a nut main body having a cylindrical shape through which a screw shaft passes; and
a circulation component assembled to the nut main body, wherein
the nut main body comprises:
a housing part that is an indentation disposed on an outer peripheral surface of the nut main body and has a bow shape when viewed from an axial direction parallel with the screw shaft;
a seat surface forming a bottom surface of the housing part;
a through hole passing through the seat surface and an inner peripheral surface of the nut main body; and
a pair of side surfaces opposed to each other that are arranged on both sides in the axial direction parallel with the screw shaft with respect to the housing part,
a direction parallel with the seat surface when viewed from the axial direction is a seat surface direction,
a direction perpendicular to the seat surface, which is the direction that the seat surface faces, is a first vertical direction,
the circulation component comprises:
a circulation component main body arranged in the housing part and the through hole;
two arm parts extending from the circulation component main body toward both sides in the seat surface direction, and abutting on the seat surface;
ribs projecting from the respective two arm parts in the first vertical direction, and extending in the seat surface direction along the side surface; and
a caulking part obtained by caulking at least part of the rib toward the side surface,
a recessed part as a groove extending in the seat surface direction and being opposed to the rib in the axial direction is disposed on each of the pair of side surfaces, the recessed part that the caulking part enters,
a ball passage extending in a tangential direction with respect to a raceway for a ball is disposed on the circulation component main body,
the circulation component is obtained by joining an inner peripheral side component to an outer peripheral side component that are divided at a division surface extending along the ball passage when viewed from the axial direction,
the inner peripheral side component comprises:
a tongue that scoops up the ball from the raceway;
an inner peripheral side rolling surface surrounding an inner peripheral side of the ball passage; and
one of the two arm parts, and
the outer peripheral side component comprises:
an outer peripheral side rolling surface surrounding an outer peripheral side of the ball passage; and
the other one of the two arm parts.

2. A nut comprising:
a nut main body having a cylindrical shape through which a screw shaft passes; and
a circulation component assembled to the nut main body, wherein
the nut main body comprises:
    a housing part that is an indentation disposed on an outer peripheral surface of the nut main body and has a bow shape when viewed from an axial direction parallel with the screw shaft;
    a seat surface forming a bottom surface of the housing part;
    a through hole passing through the seat surface and an inner peripheral surface of the nut main body; and
    a pair of side surfaces opposed to each other that are arranged on both sides in the axial direction parallel with the screw shaft with respect to the housing part,
a direction parallel with the seat surface when viewed from the axial direction is a seat surface direction,
a direction perpendicular to the seat surface, which is the direction that the seat surface faces, is a first vertical direction,
the circulation component comprises:
    a circulation component main body arranged in the housing part and the through hole;
    two arm parts extending from the circulation component main body toward both sides in the seat surface direction, and abutting on the seat surface;
    ribs projecting from the respective two arm parts in the first vertical direction, and extending in the seat surface direction along the side surface; and
    a caulking part obtained by caulking at least part of the rib toward the side surface,
a recessed part as a groove extending in the seat surface direction and being opposed to the rib in the axial direction is disposed on each of the pair of side surfaces, the recessed part that the caulking part enters,
a ball passage extending in a tangential direction with respect to a raceway for a ball is disposed on the circulation component main body,
the circulation component is obtained by joining an inner peripheral side component to an outer peripheral side component that are divided at a division surface extending along the ball passage when viewed from the axial direction,
the inner peripheral side component comprises:
    a tongue that scoops up the ball from the raceway;
    an inner peripheral side rolling surface surrounding an inner peripheral side of the ball passage; and
    an inner peripheral side division surface extending along the division surface,
the outer peripheral side component comprises:
    an outer peripheral side rolling surface surrounding an outer peripheral side of the ball passage;
    the two arm parts; and
    an outer peripheral side division surface extending along the division surface,
a projection projecting in the seat surface direction and extending in the axial direction is disposed on one of the inner peripheral side division surface and the outer peripheral side division surface, and
a groove part that is recessed in the axial direction with which the projection is engaged is disposed on the other one of the inner peripheral side division surface and the outer peripheral side division surface.

3. The nut according to claim 2, wherein
the division surface includes:
    an oblique surface along a direction parallel with the tangential direction when viewed from the axial direction, the oblique surface positioned to be closer to one side in the seat surface direction toward the first vertical direction; and
    a vertical surface that is arranged to be closer to one side in the seat surface direction than the oblique surface, and extends in the first vertical direction,
the projection and the groove part are disposed on the vertical surface, and
movement of the inner peripheral side component is regulated by the oblique surface, the movement in a direction of releasing engagement between the projection and the groove part.

4. The nut according to claim 1, wherein
the pair of side surfaces include:
    a first side surface arranged on one side in the axial direction with respect to the circulation component; and
    a second side surface arranged on the other side in the axial direction with respect to the circulation component,
the rib includes:
    a first rib extending along the first side surface; and
    a second rib extending along the second side surface, and
the caulking part includes:
    a first caulking part that is part of the first rib and caulked to the first side surface; and
    a second caulking part that is part of the second rib and caulked to the second side surface.

5. The nut according to claim 1, wherein
the seat surface includes an expanded seat surface that is an edge of the through hole, and arranged in the axial direction with respect to the through hole, and
the inner peripheral side component includes an expanded seated surface abutting on the expanded seat surface.

6. The nut according to claim 1, wherein each of the inner peripheral side rolling surface and the outer peripheral side rolling surface is a groove surface.

7. The nut according to claim 1, wherein the outer peripheral side rolling surface is a plane.

8. The nut according to claim 1, wherein
the nut main body includes a positioning hole that is recessed in the axial direction from the side surface, and opens to an outer peripheral surface of the nut main body, and
the circulation component main body includes a positioning projection projecting in the axial direction to be inserted into the positioning hole.

9. A ball screw device comprising:
the nut according to claim 1;
a screw shaft passing through the nut; and
a plurality of balls arranged between the nut and the screw shaft.

10. The nut according to claim 2, wherein
the pair of side surfaces include:
    a first side surface arranged on one side in the axial direction with respect to the circulation component; and
    a second side surface arranged on the other side in the axial direction with respect to the circulation component, the rib includes:
- a first rib extending along the first side surface; and
- a second rib extending along the second side surface, and the caulking part includes:
- a first caulking part that is part of the first rib and caulked to the first side surface; and
- a second caulking part that is part of the second rib and caulked to the second side surface.

11. The nut according to claim 2, wherein
the seat surface includes an expanded seat surface that is an edge of the through hole, and arranged in the axial direction with respect to the through hole, and
the inner peripheral side component includes an expanded seated surface abutting on the expanded seat surface.

12. The nut according to claim 2, wherein each of the inner peripheral side rolling surface and the outer peripheral side rolling surface is a groove surface.

13. The nut according to claim 2, wherein the outer peripheral side rolling surface is a plane.

14. The nut according to claim 2, wherein
the nut main body includes a positioning hole that is recessed in the axial direction from the side surface, and opens to an outer peripheral surface of the nut main body, and
the circulation component main body includes a positioning projection projecting in the axial direction to be inserted into the positioning hole.

15. A ball screw device comprising:
the nut according to claim 2;
a screw shaft passing through the nut; and
a plurality of balls arranged between the nut and the screw shaft.

* * * * *